United States Patent [19]

Rehme et al.

[11] Patent Number: 5,001,651

[45] Date of Patent: Mar. 19, 1991

[54] METHOD AND APPARATUS FOR INTERPOLATING GROUPS OF PIXELS ON A SCAN LINE

[75] Inventors: Edwin L. Rehme, Longmont, Colo.; Vahid A. Samiee, Tualatin, Oreg.

[73] Assignee: Auto-trol Technology Corporation, Denver, Colo.

[21] Appl. No.: 929,083

[22] Filed: Nov. 10, 1986

[51] Int. Cl.$^5$ ............................................. G06F 3/14
[52] U.S. Cl. ..................................... 364/518; 340/728; 364/723
[58] Field of Search ............... 358/163, 166, 135, 903, 358/78, 80, 428, 429, 460–462; 340/728, 731, 729, 742, 744, 793, 903; 364/754, 757, 768, 518–522, 723

[56] References Cited

U.S. PATENT DOCUMENTS

| | | | |
|---|---|---|---|
| 4,215,414 | 7/1980 | Huelsman | 340/728 X |
| 4,297,691 | 10/1981 | Kodama et al. | 340/793 X |
| 4,354,243 | 10/1982 | Ryan et al. | 358/163 X |
| 4,486,785 | 12/1984 | Lasmer et al. | 340/728 X |
| 4,586,038 | 4/1986 | Sims et al. | 340/729 |
| 4,706,211 | 11/1987 | Yamazaki et al. | 364/757 X |
| 4,747,157 | 5/1988 | Kurakake et al. | 382/54 X |
| 4,750,144 | 6/1988 | Wilcox | 364/757 X |
| 4,783,649 | 11/1988 | Fuchs et al. | 340/747 |
| 4,791,582 | 12/1988 | Ueda et al. | 340/744 X |

*Primary Examiner*—David L. Clark
*Attorney, Agent, or Firm*—Rothgerber, Appel, Powers & Johnson

[57] ABSTRACT

A pixel control system and method of controlling the intensity of pixels on a raster video display screen with scan lines grouped in 20 pixel increments across the scan line to display an object. In a first operational sequence for a given polygon that represents a part of the object separate red, blue, green and depth sections use the value (R) of a reference pixel in a first pixel group at the left side of the object to determine the pixel by pixel change (delta) in intensity and depth across the first pixel group. The sections are operated in successive operational sequences to process the other pixel groups along the scan line until the pixel group at the right side of the polygon is processed. The operations are repeated in respect to successive scan lines to process the entire polygon. Each section has two adder stages. The first stage produces signals representing R, R plus and minus certain deltas and selected other deltas. The second stage produces other R plus delta signals so that after set up there is one signal for each of the 20 pixels per pixel group output at the same time to provide intensity signals for each group, where the intensity varies uniformly on a pixel by pixel basis across each group and from group to group.

24 Claims, 13 Drawing Sheets

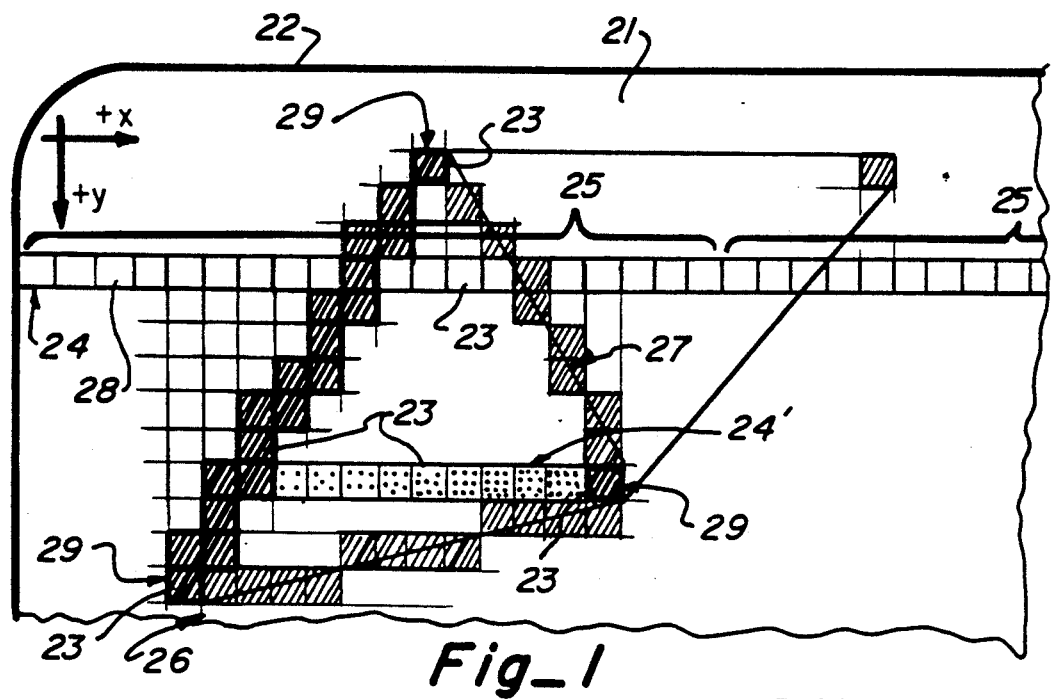
Fig_1
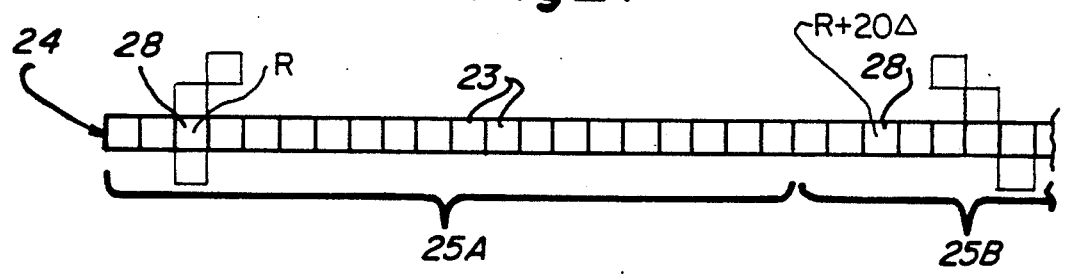
Fig_2
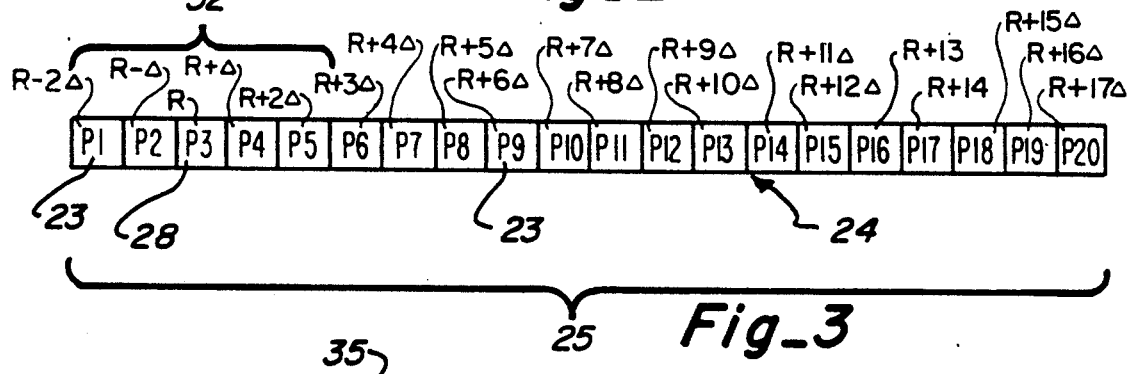
Fig_3
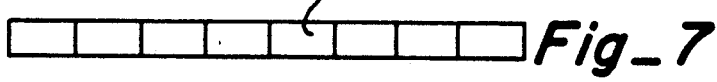
Fig_7
Fig_8
Fig_9

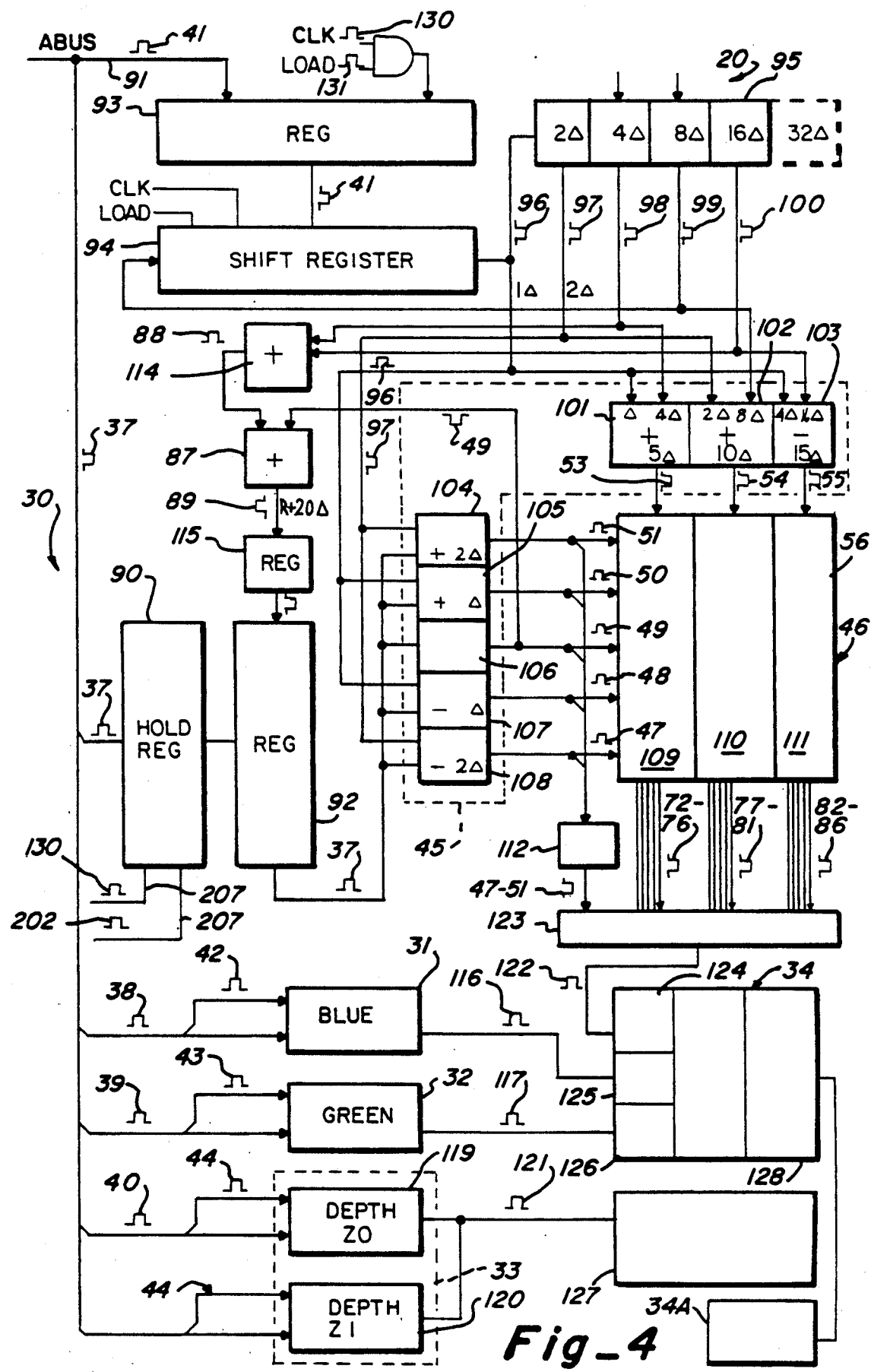
Fig_4

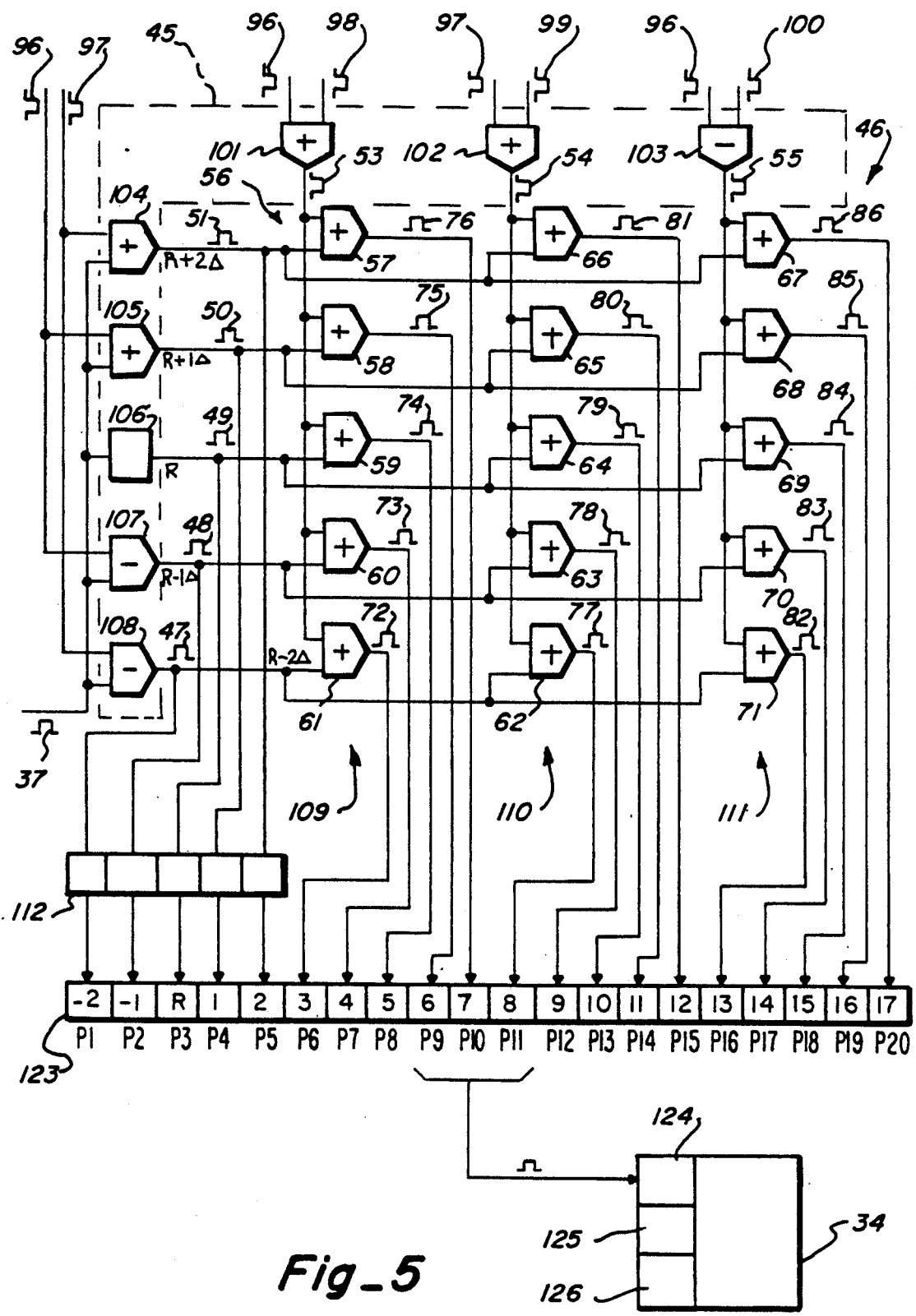
Fig_5

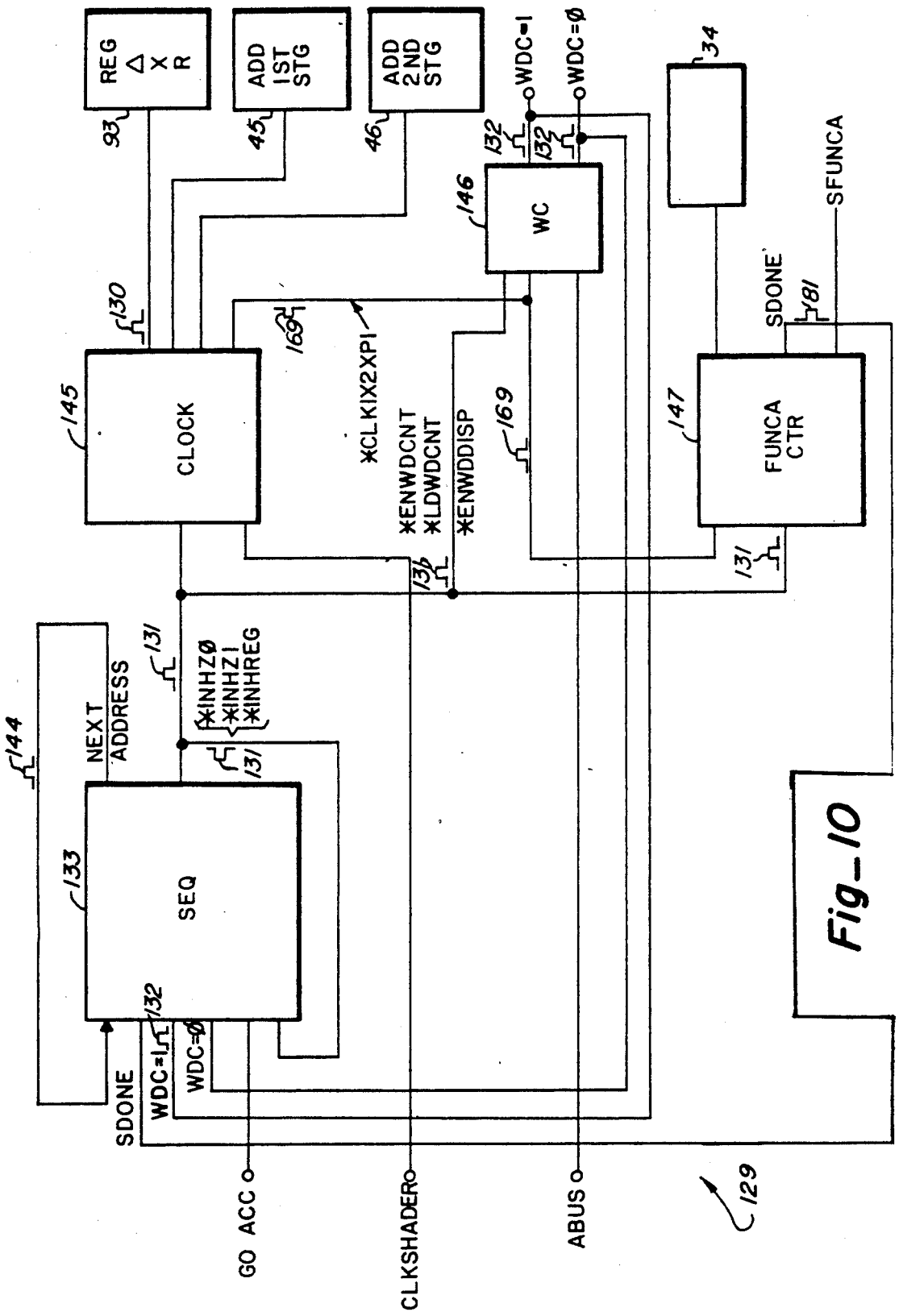

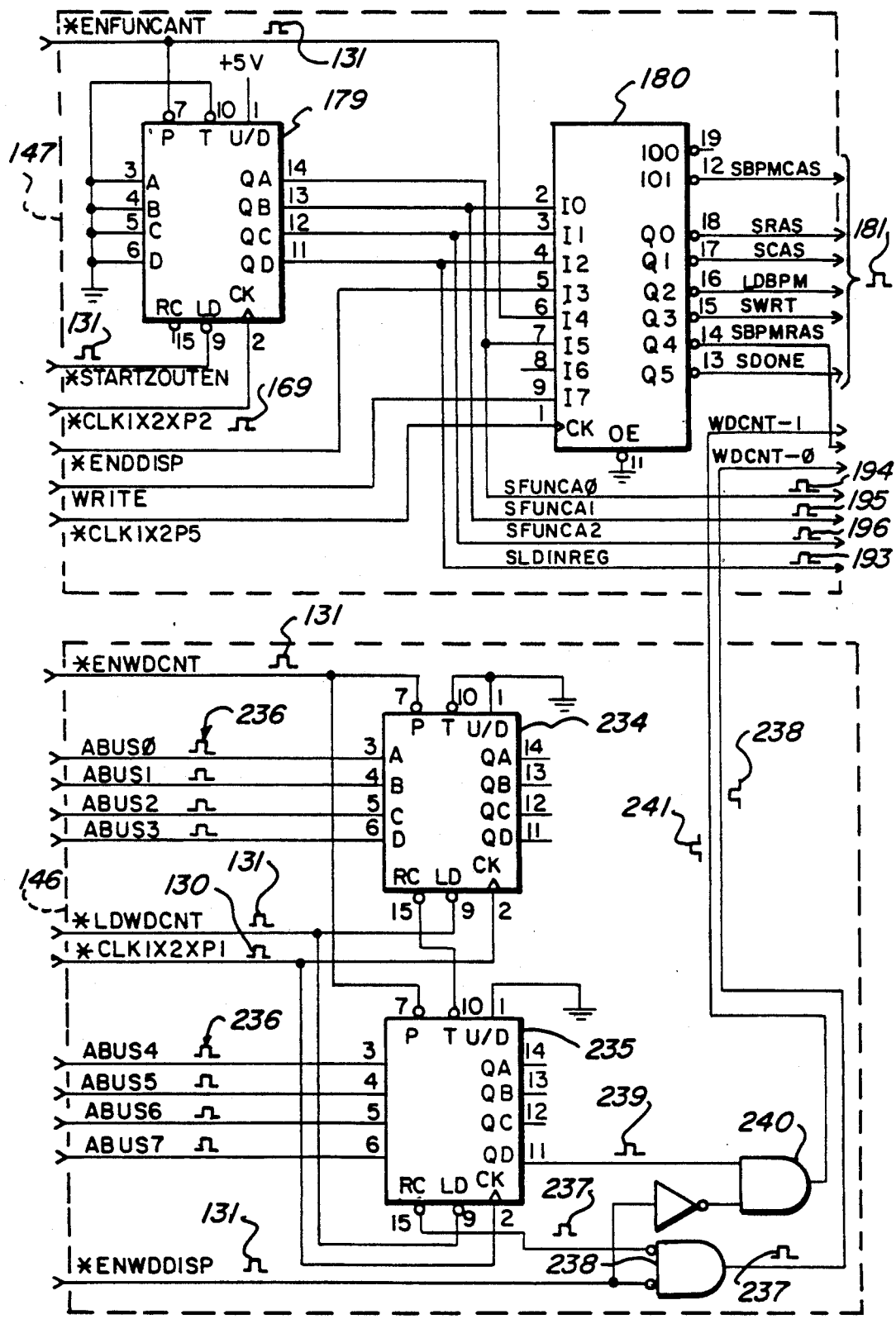
Fig_11A

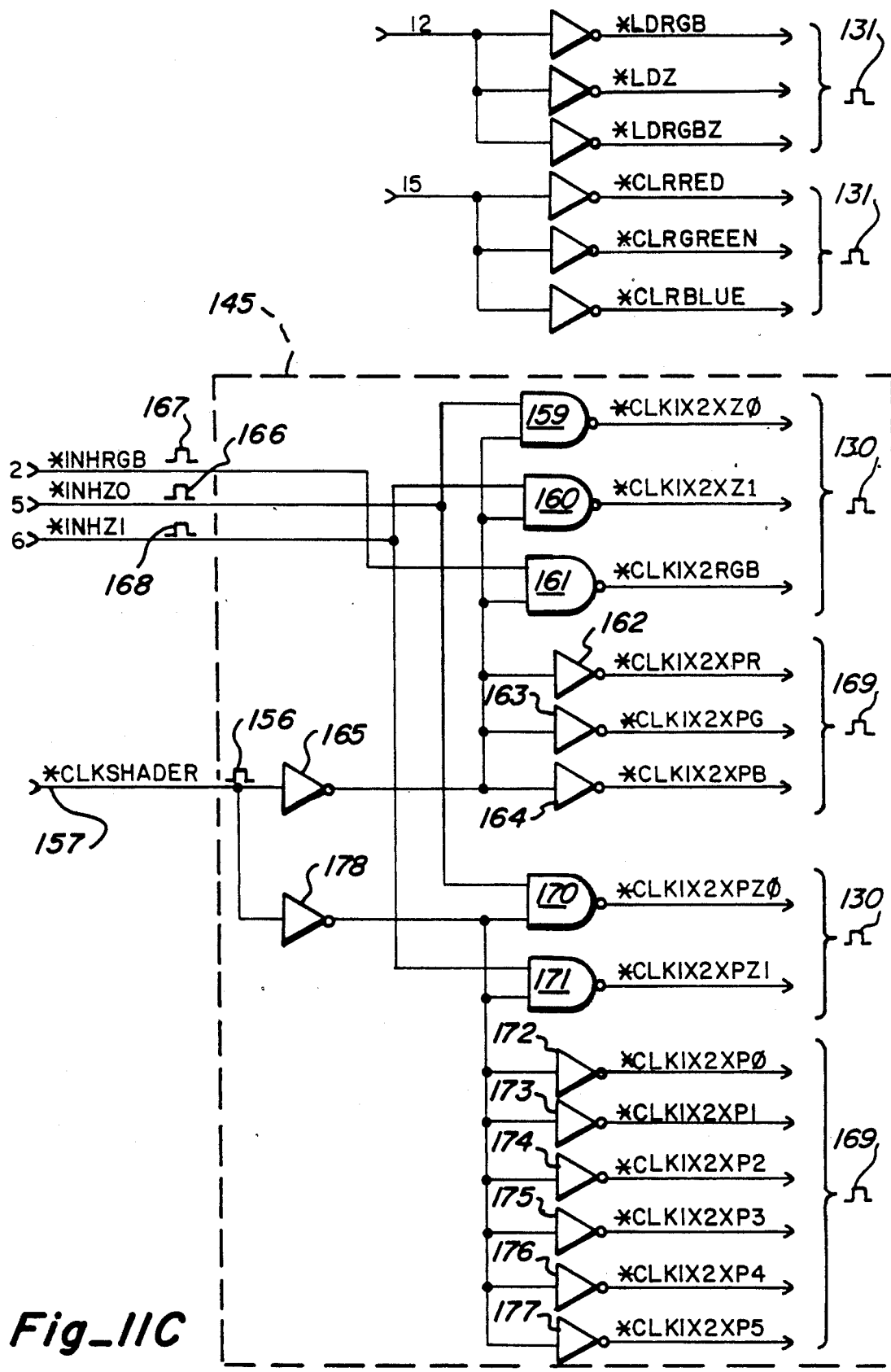
Fig_11C

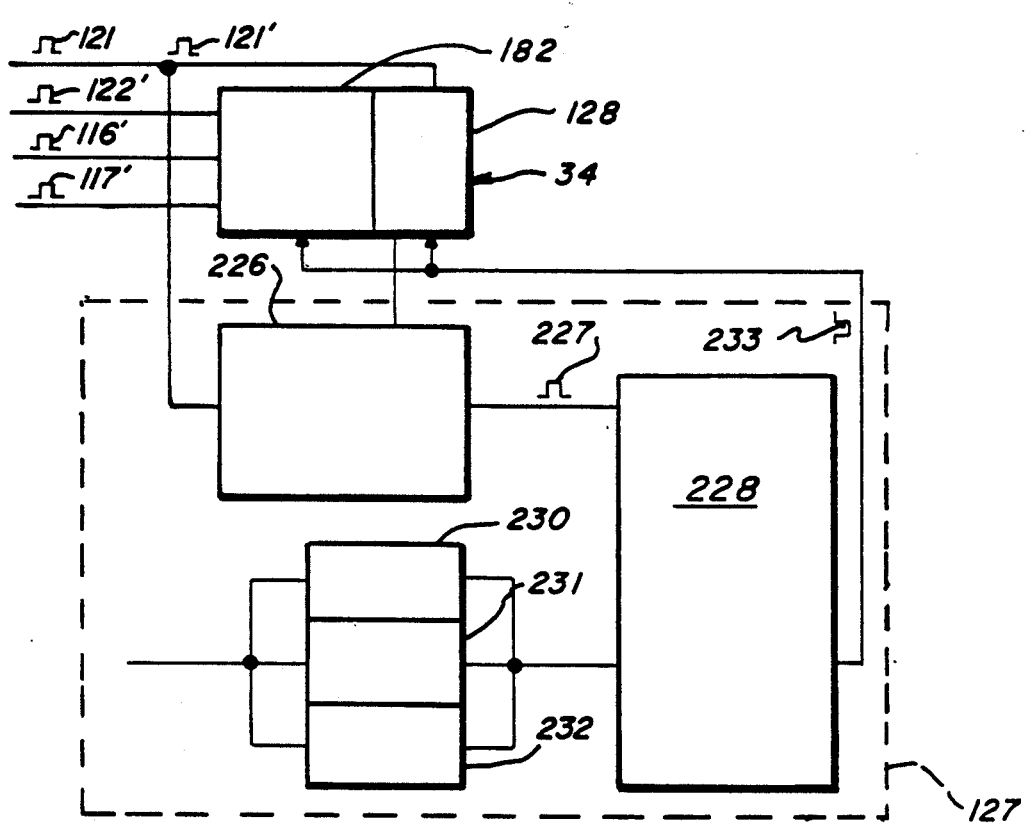
Fig_6
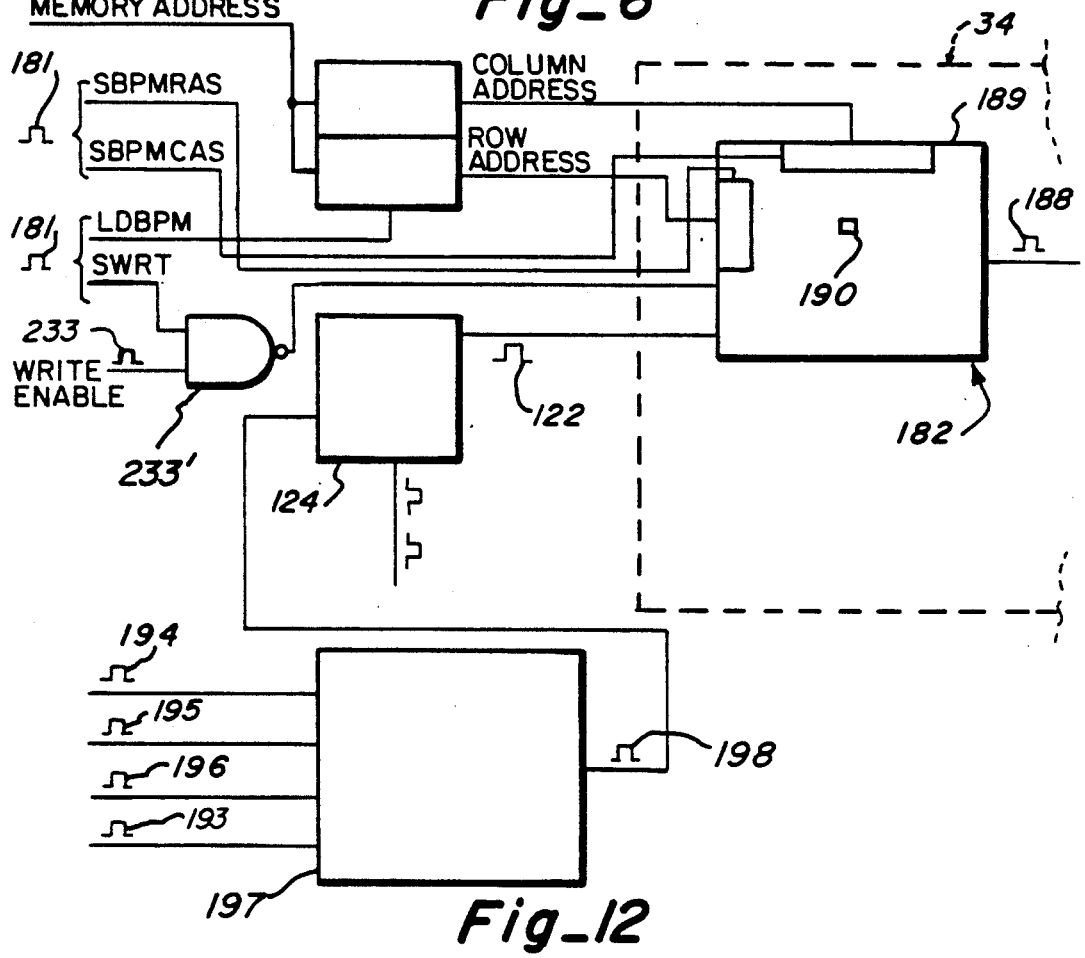
Fig_12

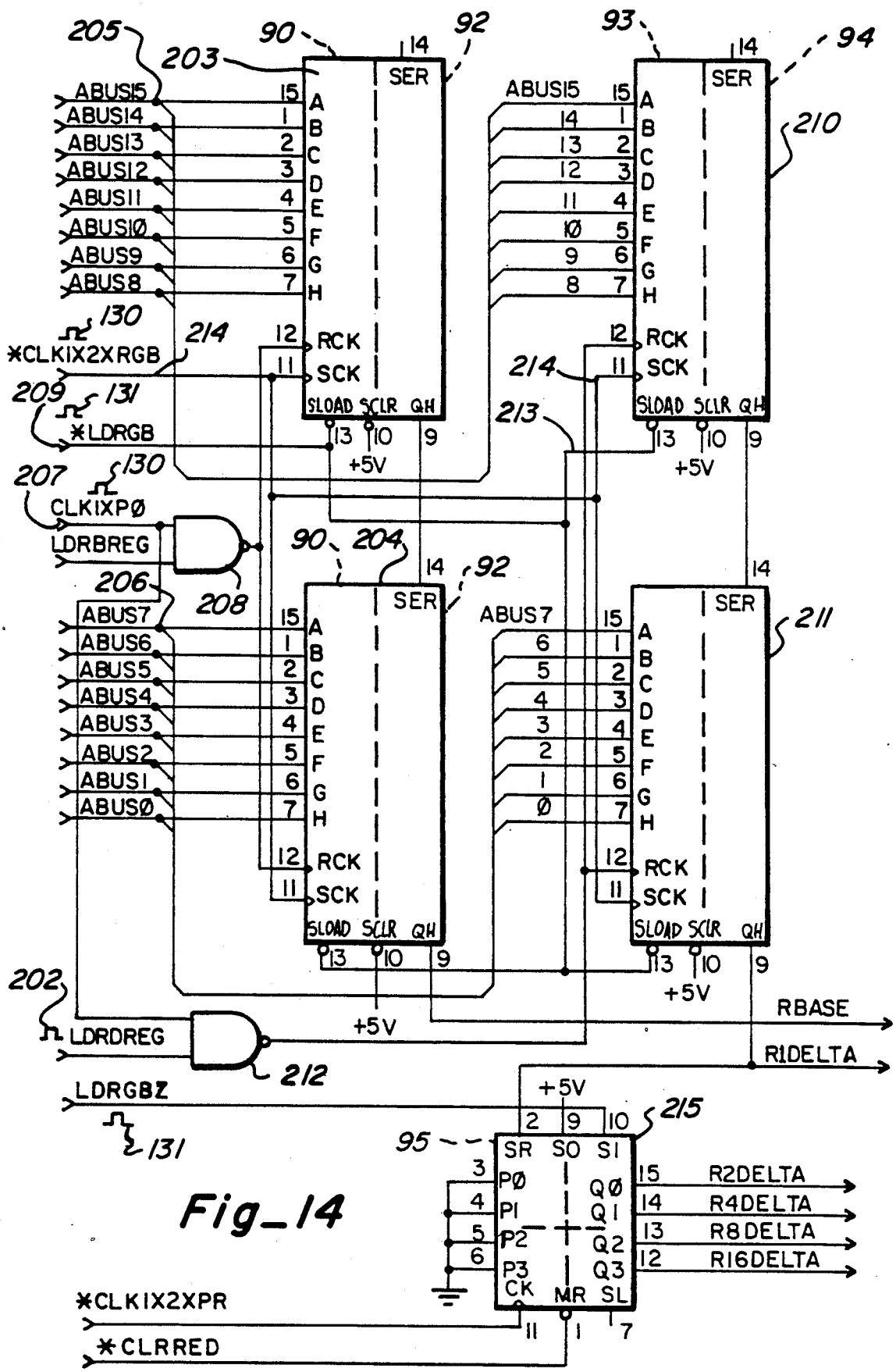
Fig_14

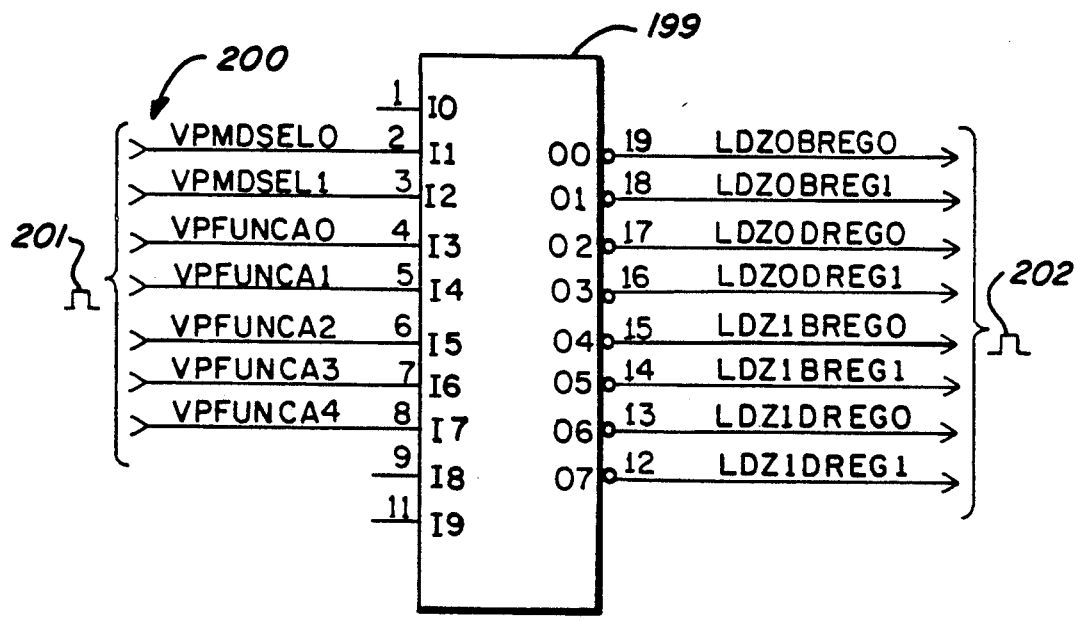
Fig_13
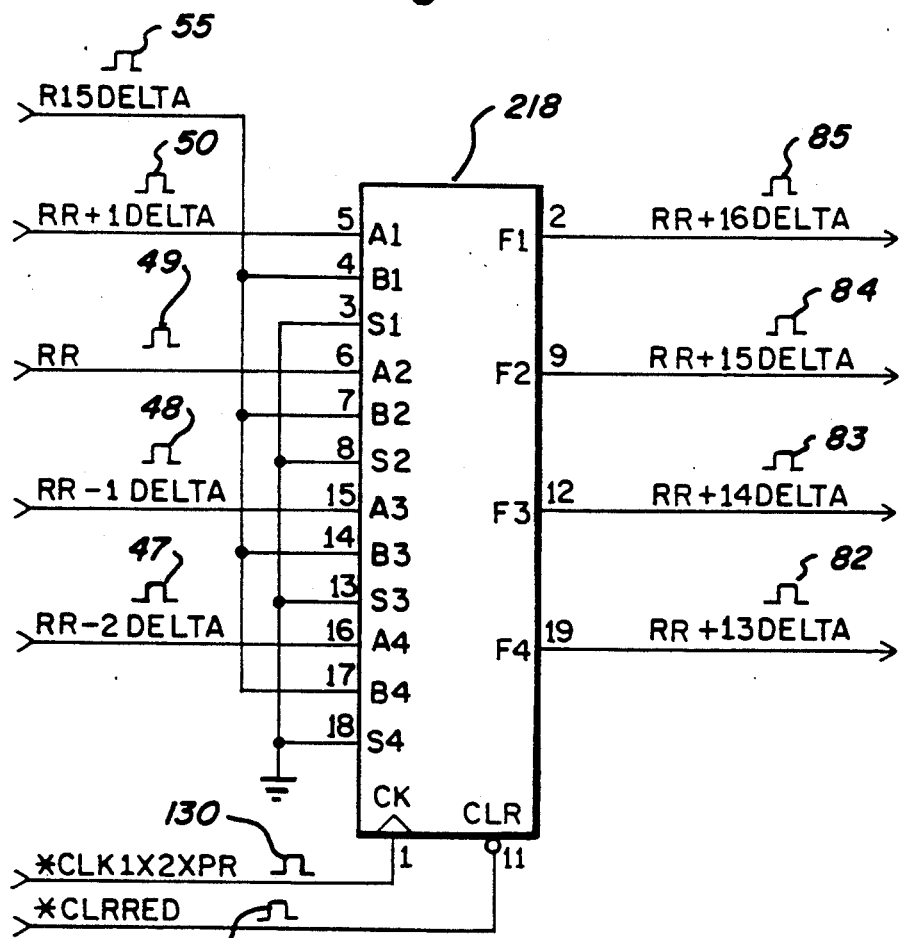
Fig_15

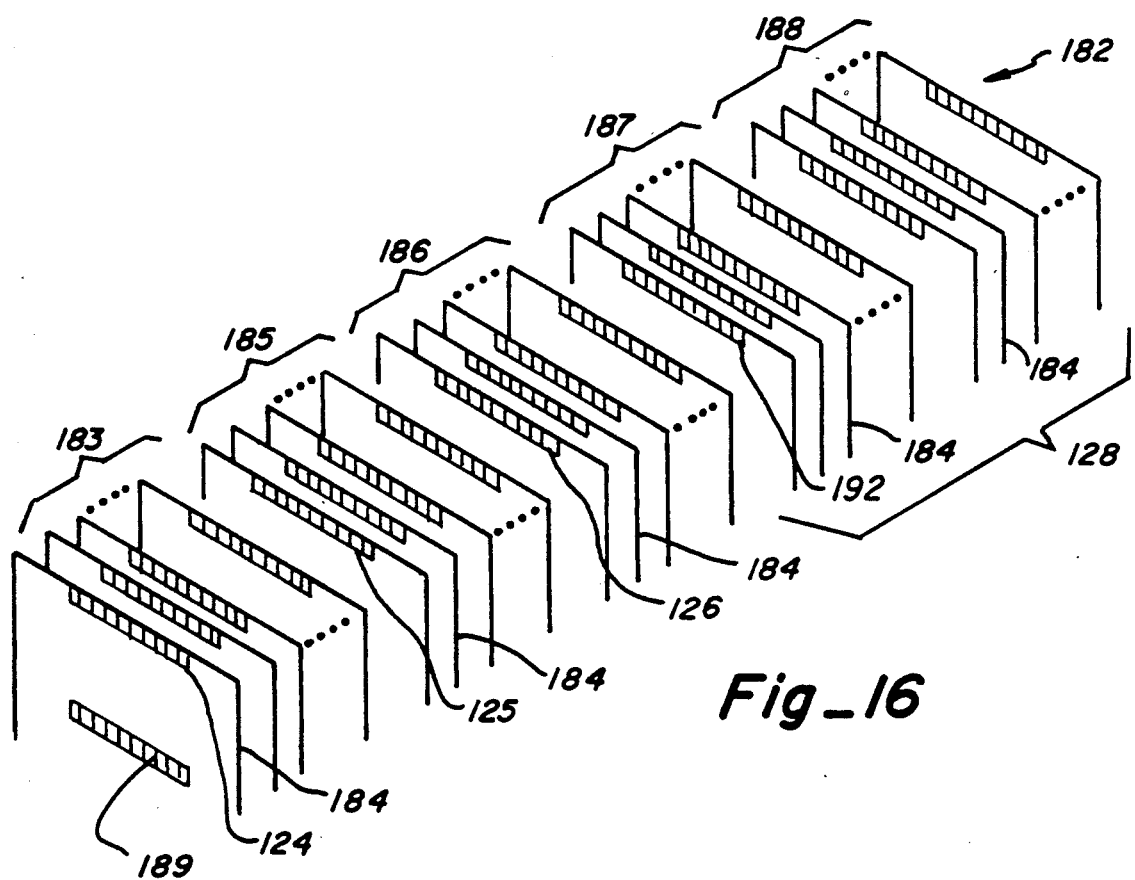
Fig_16

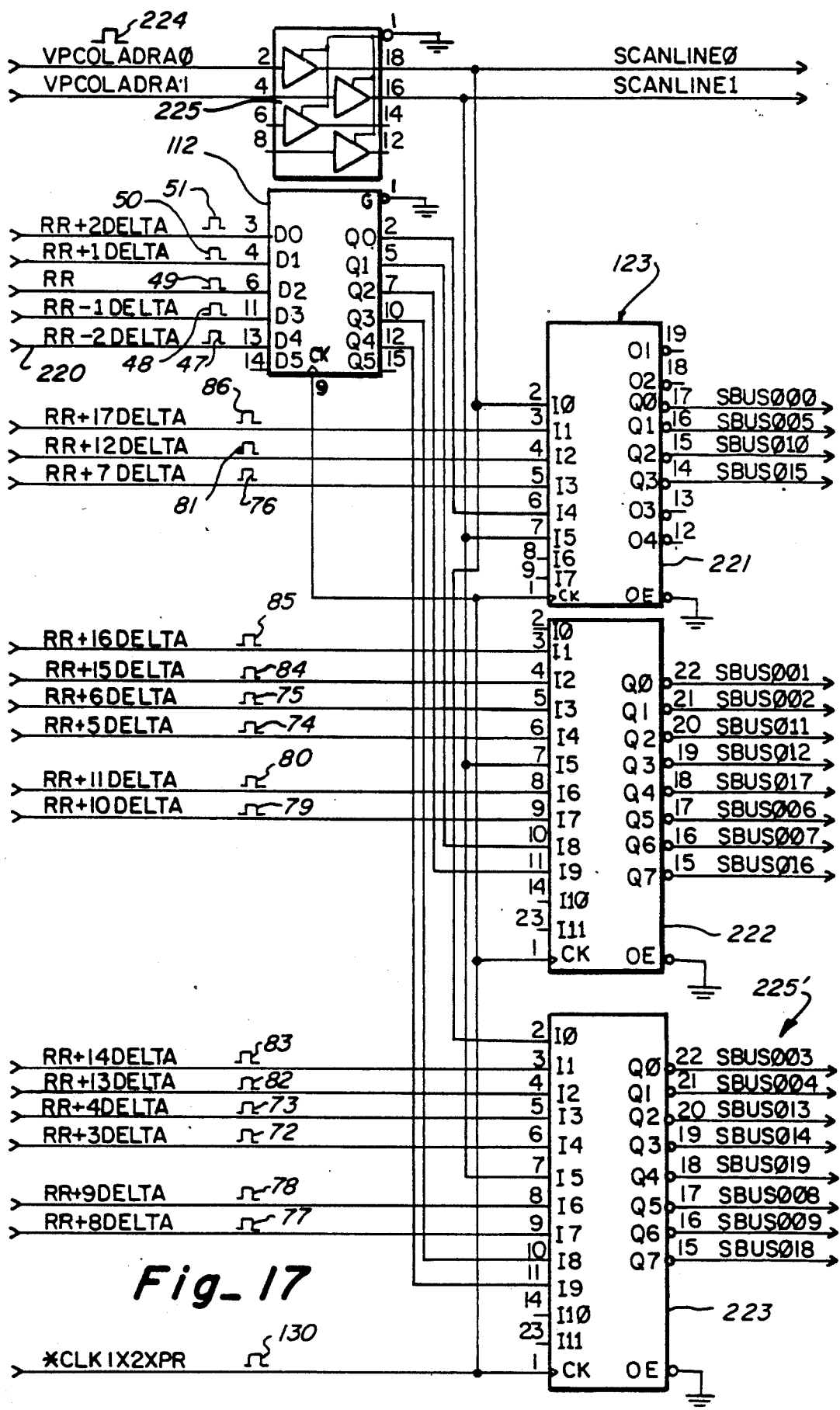
Fig_17

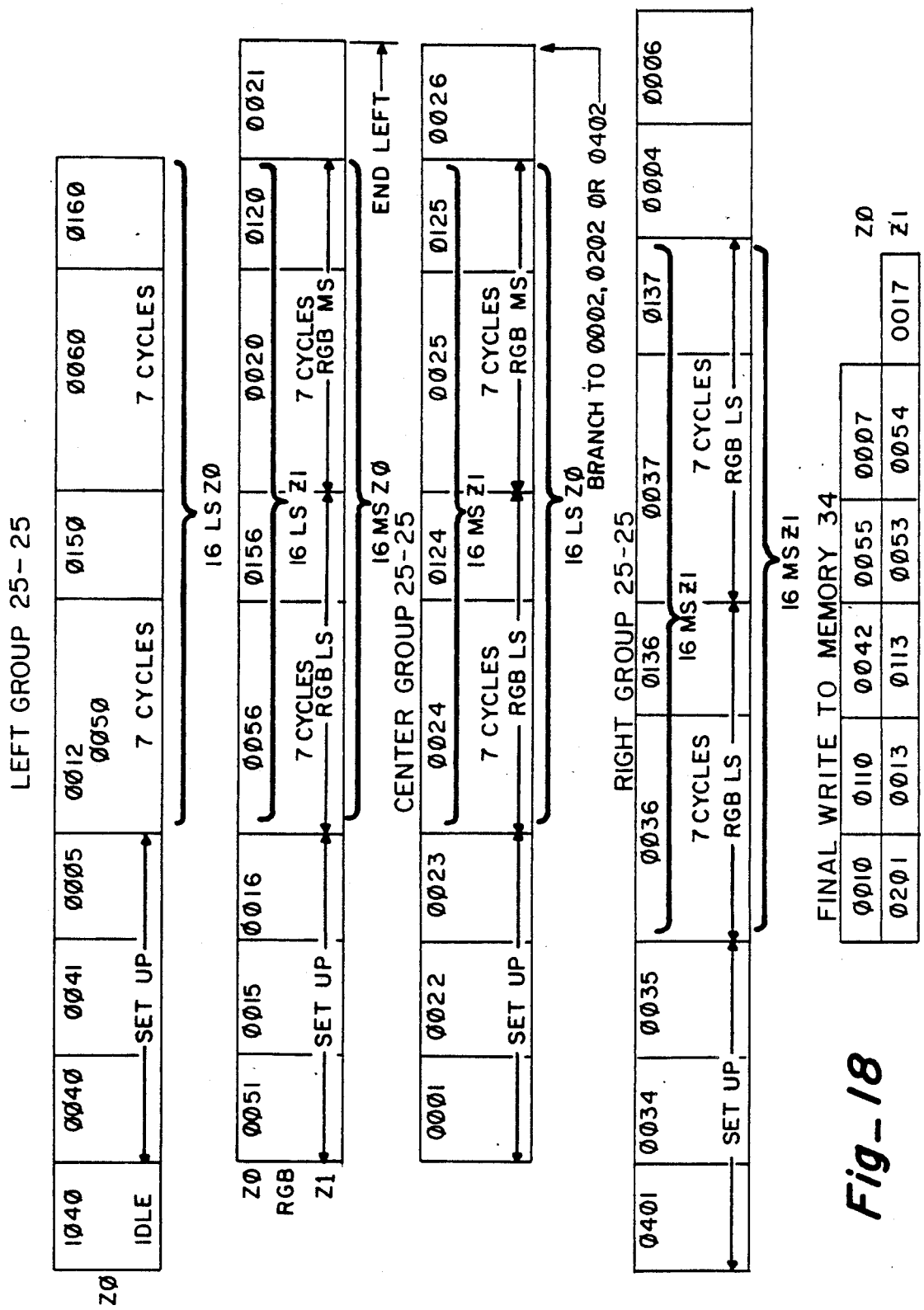
Fig_18

METHOD AND APPARATUS FOR INTERPOLATING GROUPS OF PIXELS ON A SCAN LINE

BACKGROUND OF THE INVENTION

1. Field of the Invention

The present invention relates to the field of computer graphics and more particularly to the field of displaying objects on the screen of a cathode ray tube.

2. Description of the Prior Art

Computer graphics systems for displaying objects on the screen of a display device required very rapid processing of large amounts of data to enable the displayed object to be moved or the shading of the surface of the object to vary with movement of the object or variations in the location of a source of light that is shining on the object. This need for rapid computation has resulted in reduction of the time required to specify the object to be displayed in terms of the many points or vertices that are organized to form polygons that define the surface of the object.

With the location of such points defined, the next step in displaying the object is to rapidly convert such points into data indicating which picture elements ("pixels") on the screen of a display device must be illuminated or turned ON in order to display the object. This involves the steps of processing pairs of vertices that define an edge to indicate which pixels on the screen must be turned ON to draw the edge between pairs of vertices. Also, because the screen may have hundreds of pixels in each of the x and y coordinate directions (such as 1280 by 1024), the data defining which pixels must be turned ON must be stored in a manner suitable for controlling the video function of the display device. For example, when the display device functions on a scan line by scan line basis as is customary, the manner in which the pixels of the screen are processed for drawing lines and for data storage purposes must be specially related to the scan lines so as to minimize storage requirements without reducing the speed of the scanning operation.

To achieve some of these objectives, in the past the screen of the display device has been divided up into row address blocks that are related to DRAM chips that are selected for storing the pixel ON data. Such row address blocks have been identified with respect to addresses within the DRAM, such as by having a given block for a given row address extend 128 column addresses in the x direction on the screen and two column addresses in the y direction on the screen. To reduce the number of times that a given edge drawn on the screen must be re-addressed into different DRAM row addresses, others have arranged the row address blocks more symmetrically by providing a block for a given row address in DRAM that extends in both the x and y directions 16 column addresses. As a result, unless the edge is horizontal, the edge can extend through more column addresses before a new row of the DRAM must be addressed.

Having reduced the number of times that the DRAM row addresses must be re-addressed as the edge is drawn from row address block to row address block, others have then organized the pixels within a given row address block into groups, such as groups of 64 pixels formed by 8 pixels in the x direction on the screen and 8 pixels in the y direction on the screen. Others have used groups of 20 pixels formed by groups of 5 pixels in the x direction and 4 pixels in the y direction. Such group of pixels has been referred to as a "matrix". Each matrix in a given row address block has a specific DRAM column address.

Such pixel group or matrix has been used in the past to define a unit or group of pixels that are written into the DRAM at the same time. Initially, the determination of which pixel out of the 20 pixels in such matrix will be ON has been performed on a pixel by pixel basis using a number of machine cycles, where one machine cycle occurs for every one clock cycle of a bit slice processor, for example. Once the determination has been completed for all the pixels in the matrix, then the entire matrix, representing the pixels that should be ON and OFF of the group of 20 pixels, is written into the DRAM in one or more additional machine cycles. In this approach, there is no need to determine which matrix the edge will extend into next (the "next matrix") during the computation of the pixels for a particular or "current" matrix. Rather, only when the next "ON" pixel of the next matrix is identified is the next matrix identified. This occurs after the writing of the current matrix into the DRAM. In this prior method, it may be understood that it required 5 machine cycles to identify the 5 pixels that must be turned on in order to have an edge completely cross a given matrix. Thus, at least 5 machine cycles were required to identify such ON pixels and one or more additional cycles to write them into the DRAM. However, there have also been reductions in the number of machine cycles required to identify the ON pixels in such matrix.

Having defined the pixels that must be ON in order to draw the edge between two vertices, the display of surfaces of the object and the removal of hidden edges of the object have involved shading the surfaces and determining the depths of such surfaces relative to each other along a field of view. When the object is displayed in color, the shading is performed for each color component, such as red, blue, and green.

In the past, intensity interpolation shading, referred to as Gouraud shading for its developer, has been used to linearly interpolate vertex intensities along each edge of a polygon. Then, the intensities of pixels along a given scan line that extends between such edges are obtained by linear interpolation from one polygon edge to the other. Certain general purpose computers have been used for shading. However, experience with them indicates that the determination of the intensity per pixel has required more than one machine cycle. In some cases from 3 to 10 machine cycles have been required for each instruction of the shading process, and one or more instructions are required per pixel. As a result of such number of machine cycles required to determine the intensity of each pixel, such computers have not been able to perform shading as fast as the rate at which line drawing systems define the objects to be displayed. With further increases in the available speed for specifying the vertices that define the surface of the object, and with further increases in the speed at which line drawing apparatus operates to define the ON pixels that define a polygon edge, there are increasing requirements for faster ways to shade the surfaces of the object and to define the relative depths of such surfaces.

SUMMARY OF THE INVENTION

In contrast to the prior art that required a number of machine cycles to define the intensity of a pixel among the pixels along a given scan line, the preferred embodiment of the present invention can control the intensity and depth of "n" pixels (in a group along a scan line) in "n" machine cycles with a minimum number of cycles required for set-up.

Pixel control apparatus and method according to the present invention reduce the time required to define the intensity and depth of pixels so that an object can be displayed on the screen of a display device more quickly.

The present invention divides the pixels in the scan line into groups of "n" pixels and provides sets of adders to rapidly add intensity or depth delta values to the value of a reference pixel in the group of pixels such that the intensity or depth value of a given pixel is proportional to the distance of the given pixel from the reference pixel.

The apparatus of the present invention is cycled to provide serial adding of the bits that represent each of the pixels in a group.

Such method and apparatus also increase the speed of determining shading and depth of pixels in a given pixel group by providing only two adder stages, where the first adder stage (1) directly adds delta values to the intensity and depth values of a reference pixel so that the intensity and depth values of the pixels in a subsection of the group change increasingly from pixel to pixel, and (2) provides selected multiples of the delta intensity and depth values, such that the second adder stage, which provides many serial adders arranged in parallel to simultaneously add selected ones of the delta multiples to selected ones of the sums produced by the first adder stage, defines the intensity and depth values of the other pixels in the group.

With these and other objects in mind, the present pixel control apparatus and method are effective to vary the values of signals that represent pixels in a scan line that extends across a display screen. The values represent the intensity or the depth of the portion of an object that the pixel is to represent on the display screen. An input or reference signal is supplied and represents the value of a reference pixel in a first pixel group of the scan line. Delta signals are also supplied and represent unitary and multiple increments or deltas by which the reference pixel signal changes from pixel to pixel across a group of the pixels. A first stage of adders is connected to receive certain of the delta signals and to receive the reference signal for simultaneously varying the value of the reference signal once for each pixel in a given subgroup of pixels in a given scan line. The delta amount added to the reference signal increases with increased distance of a given pixel in the subgroup from the reference pixel to generate a series of first output signals, including an output signal for each pixel in the subgroup. The first stage of adders also produces delta signals that are higher multiples of delta.

A second stage of adders is connected to the first stage of adders. The adders of the second stage are arranged in parallel and are selectively connected to receive certain of the first output signals and certain of the multiple delta signals to generate additional output signals representing the intensity and depth of all other pixels in the group. The number of adders in the first and second stages is selected so that there is one of the first or the additional output signals for each pixel in the group of pixels along the scan line.

A series of adders is connected to provide a predetermined delta signal and add it to the reference signal for supplying a next reference signal representing the value of the reference pixel in the next successive group of pixels along the scan line. The first and second stages of adders are cycled so that the first and additional output signals are also generated for each pixel in the next successive group of pixels. The determination of the value of the next reference signal and the cycling of the first and second stages continue until the intensity and depth values of all the relevant pixels in the scan line have been determined.

BRIEF DESCRIPTION OF THE DRAWINGS

FIG. 1 is an enlarged front view of a portion of a display screen illustrating three vertices of a polygon and edges extending between the vertices, where the edges are formed by pixels that are ON;

FIG. 2 is an enlarged view of a portion of the display screen shown in FIG. 1 illustrating part of a scan line that extends across the screen between the polygon edges, where the scan line is divided into groups of pixels;

FIG. 3 is an enlarged view of one group of pixels of the scan line shown in FIG. 2 showing a reference pixel having reference intensity and depth values and other pixels of the group having intensity and depth values that differ by a delta value and by multiples of the delta value according to how far the pixel is from the reference pixel;

FIG. 4 is a block diagram of a pixel control system for producing output signals that represent red, blue and green intensity values and depth values of the pixels of the group, where the values differ by a delta value and multiples of the delta value according to how far the pixel is from the reference pixel;

FIG. 5 is a detailed schematic diagram of one section of the pixel control system shown in FIG. 4 illustrating two stages of adders for rapidly producing such output signals that represent the red intensity values;

FIG. 6 is a block diagram of another section of the pixel control system for determining the relative depths of the pixels of the group shown in FIG. 3;

FIG. 7 is a diagram illustrating one of the output signals as having 8 bits;

FIG. 8 is a diagram illustrating red, blue and green intensity input signals and delta signals as having 16 bits;

FIG. 9 is a diagram illustrating z0 and z1 input signals as delta signals as having 32 bits;

FIG. 10 is a block diagram of a sequence circuit for controlling the operation of the pixel control system;

FIGS. 11A, 11B and 11C form a circuit diagram of a word counter circuit, a FUNCA counter circuit, a sequencer, and a clock circuit that are included in the sequence circuit shown in FIG. 10;

FIG. 12 is a block diagram of circuit for controlling the writing of pixel color component control data to a bit plane memory;

FIG. 13 is a schematic diagram of one of four decoders that decode signals received from a unit connected to the pixel control system;

FIG. 14 is a schematic diagram of reference input registers for a reference signal and input registers for a delta signal;

FIG. 15 is a schematic diagram of an adder for generating certain of the output signals;

FIG. 16 is a diagram illustrating the bit plane memory;

FIG. 17 is a schematic diagram of output registers; and

FIG. 18 is a diagram showing the sequence in which instructions are processed to generate the output signals.

DESCRIPTION OF THE PREFERRED EMBODIMENT

Introduction

Figure 11B:
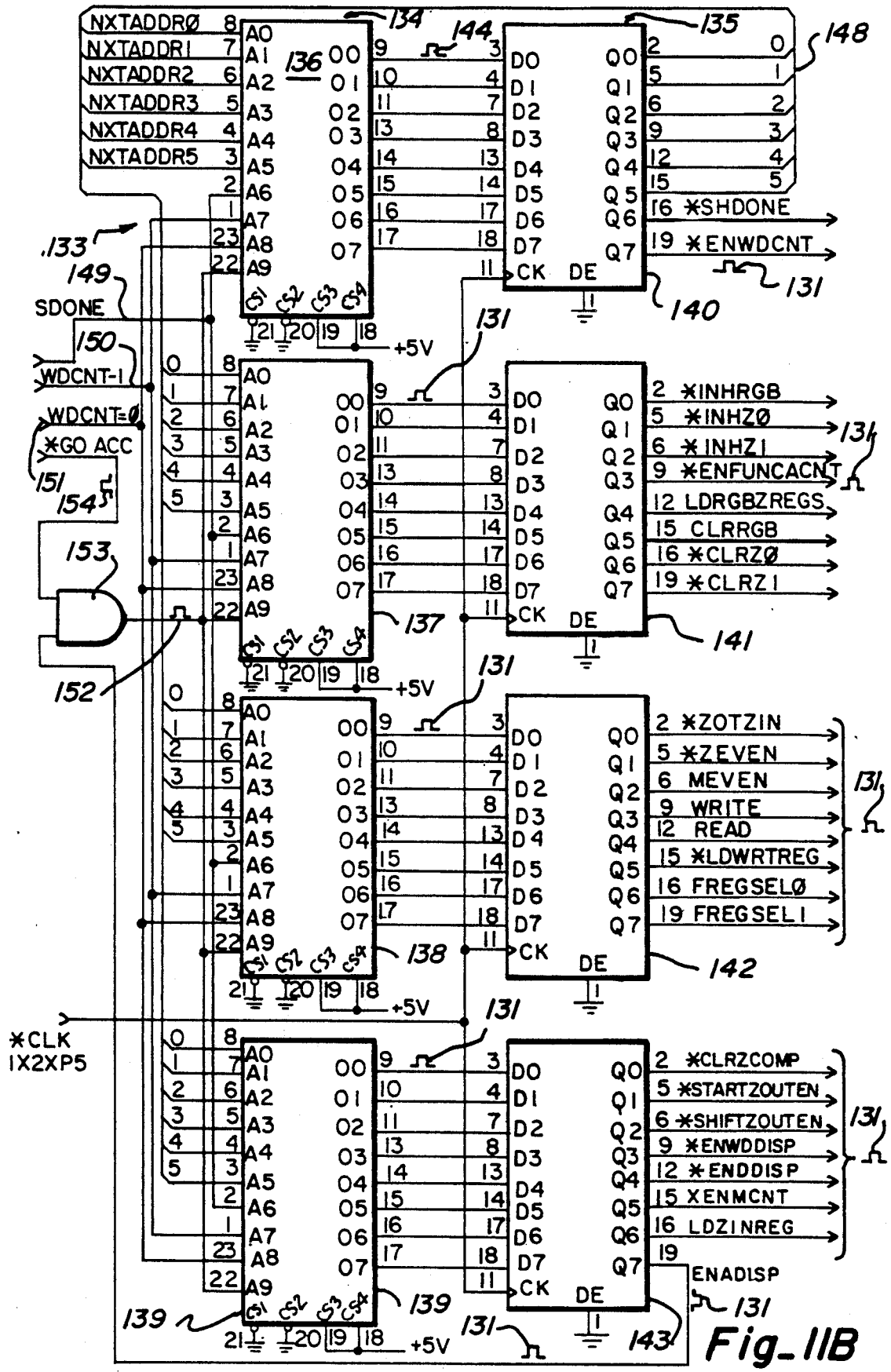

Referring now to FIGS. 1 through 4 of the drawings, a preferred embodiment of a pixel control system 20 of the present invention is shown in connection with a screen 21 of a display device, which may be a cathode ray tube (CRT) 22 in the preferred embodiment. The screen 21 is shown enlarged to illustrate numerous picture elements (pixels) 23—23. The CRT 22 selectively turns each of such pixels 23—23 either ON or OFF, with a range of intensity that extends from light to dark and according to a selected color, such as red, blue, or green.

For purposes of description, the coordinate system used to identify locations on the screen 21 is indicated by "+x" extending from left to right and "+y" extending from top to bottom.

The pixels 23—23 on the screen 21 are controlled on a scan line-by-scan line basis, where each scan line 24 extends completely across the screen 21 in the x direction and is one pixel wide in the y direction. To conform to the architecture used for storing data that is output from the pixel control system 20, each scan line 24 is divided into groups 25—25 of pixels 23—23. In the preferred embodiment of the present invention, there are 20 pixels 23—23 per group 25—25 in the x direction, such that many pixel groups 25—25 form a given scan line 24.

An object 26 is displayed on the screen by turning selected pixels ON. When the pixel control system 20 is connected to a line drawing system (not shown) that defines the object 26 in terms of polygons 27, the pixel control system 20 receives data for the polygon 27 representing the intensity and depth of a particular pixel (a reference pixel) 28 on each scan line 24. Using the data for the reference pixel 28, the system 20 defines data for the pixels 23—23 of the scan line 24 that must be ON to define the polygon 27. The ON pixels 23—23 in various scan lines 24 in FIG. 1 define the edges of the polygon 27 that extend between vertices 29—29 of the polygon 27. The data representing the reference pixel 28 on the scan line 24 includes a selected intensity for each color component. The color intensities are designated $I_R$ for the red component intensity, $I_B$ for the blue component intensity, and $I_G$ for the green component intensity.

Data associated with each such pixel 23—23 also includes the amount or increment by which the intensity for each color component ($I_R$, $I_B$, $I_G$) changes from pixel to pixel along a scan line 24. This is expressed as:

$$\frac{\Delta I_R}{\Delta X}, \frac{\Delta I_B}{\Delta X}, \text{ and } \frac{\Delta I_G}{\Delta X}$$

for the color components and is based on having a uniform change or variation in intensity from pixel to pixel across a given scan line 24.

The data also associated with each such pixel 23—23 includes its depth in the z direction (perpendicular to the x and y directions) along a field of view and the change in such depth from pixel to pixel across the scan line 24 in which such pixel 23—23 is located. These are respectively referred to as "z" and $\Delta z/\Delta X$.

Using:

$$\frac{\Delta I_R}{\Delta X}, \frac{\Delta I_B}{\Delta X}, \frac{\Delta I_G}{\Delta X} \text{ and } \frac{\Delta z}{\Delta X},$$

the pixel control system 20 also varies the intensities, for example, of the ON pixels 23—23 that are between the edges of the polygon 27 and along a scan line $24^1$ in FIG. 1, which are referred to as relevant pixels 23—23. This variation is shown increasing uniformly from left to right across the scan line $24^1$.

PIXEL CONTROL SYSTEM 20

Referring to FIGS. 1 and 4, the pixel control system 20 is shown including four separate sections 30, 31, 32, and 33 that respectively define for each of the relevant pixels 23 on a given scan line 24 the intensity $I_R$, $I_B$, $I_G$, and the depth z. This is repeated for each relevant scan line 24 of the screen 21. The output from each of the sections 30 through 33 is stored in a memory 34 prior to being read into a video controller 34A (not shown) and other parts of a video display system (FIG. 4). The memory 34 is architected to receive data for 20 pixels 23—23 at one time, which corresponds to the division of one scan line 24 into the groups 25—25 of 20 pixels 23—23. The intensity of each pixel 23 is represented in the memory 34 by an 8 bit word 35 (FIG. 7), where the 8 bits are the 8 most significant bits (MSB) received from the pixel control system 20.

The sections 30 through 33 of the pixel control system 20 operate to define the respective $I_R$, $I_B$, $I_G$, and z values for successive ones of the pixel groups 25—25 of a given scan line 24. Each such section 30 through 32 generates a 16 bit word 36 (FIG. 8) for each pixel 23—23 of the 20 pixels 23—23 in a given pixel group 25—25 before cycling to the next 20 pixel group 25—25 on the scan line 24. The use of the 16 bit word 36 provides greater accuracy of the intensity values $I_R$, $I_B$ and $I_G$, during calculation. The 8 MSB of the 16 bit word 36 are stored as the 8 bit word 35. The depth value is described below with reference to FIG. 9.

Each section 30 through 33 of the pixel control system 20 receives an appropriate input signal 37, 38, 39 or 40 respectively that represents one of the values of the respective intensities $I_R$, $I_B$, $I_G$, and the depth z for the reference pixel 28 (FIGS. 2 and 3) of the left-most group 25—25 of pixels 23—23. The appropriate sections 30, 31, 32 and 33 also receive an input signal 41, 42, 43 or 44 that represents:

$$\frac{\Delta I_R}{\Delta X}, \frac{\Delta I_B}{\Delta X}, \frac{\Delta I_G}{\Delta X}, \text{ and } \frac{\Delta z}{\Delta X},$$

respectively.

GENERAL DESCRIPTION—RED COLOR COMPONENT SECTION 30

Referring to FIGS. 4 and 5, the method and apparatus of the present invention increase the speed of determining the shading and the depth of the pixels 23—23 in a given pixel group 25—25 by providing only first and second adder stages 45 and 46. In the red section 30, for example, the first adder stage 45 directly adds to the input signal 37 (representing the intensity value $I_R$ of the reference pixel 28) the delta values $\Delta R/\Delta x$ and $2 \blacktriangle R / \blacktriangle x$ (abbreviated $1\Delta$ and $2\Delta$ in the drawings) so that output signals 47, 48, 49, 50 and 51 representing the intensities $I_R$ of pixels 23—23 of a subgroup 52 (FIG. 3) of the group 25—25 change increasingly from pixel 23 to pixel 23 from left to right across the scan line 24. Still referring to FIG. 3, the new values of the first five pixels 23—23 in the subgroup 52 can be as shown in Chart I, where "P1" for example designates the leftmost pixel 23—23 and the other pixels 23—23 in the group 25—25 are numbered sequentially "P2" through "P20";

Chart I
Pixel Values of Subgroup 52

| Pixel No. In Subgroup 52 | $I_R$ Value (R = Reference Pixel $I_R$ Value) | Output Signal |
|---|---|---|
| P1 | $R - \dfrac{2\Delta I_R}{\Delta X}$ | 47 |
| P2 | $R - \dfrac{\Delta I_R}{\Delta X}$ | 48 |
| P3 | $R$ | 49 |
| P4 | $R + \dfrac{\Delta I_R}{\Delta X}$ | 50 |
| P5 | $R + \dfrac{2\Delta I_R}{\Delta X}$ | 51 |

The first adder stage 45 also provides multiple delta signals 53, 54 and 55 representing, respectively, the following selected multiples of the delta intensity:

$$\frac{5\Delta I_R}{\Delta X}, \frac{10\Delta I_R}{\Delta X}, \text{ and } \frac{15\Delta I_R}{\Delta X}.$$

These multiples are shown as $5\Delta$, $10\Delta$, and $15\Delta$ in FIGS. 4 and 5.

The second adder stage 46 includes a parallel arrangement or array 56 of serial adders 57 through 71 (FIG. 5) that serially add selected ones of the multiple delta signals 53 through 55 (e.g. $5 \blacktriangle I_R / \blacktriangle X$) to selected ones of the output signals 47 through 51 produced by the first adder stage 45 (e.g. $R + \blacktriangle I_R / \blacktriangle X$) to produce 15 additional output signals 72 through 86 that represent the intensity values (e.g. $I_R$) of the other pixels 23—23 in the group 25—25. In particular, the parallel array 56 is designed to add the values of the output signals 47 through 51 representing the respective five pixels 23—23 of the subgroup 52 to each of the 5, 10, and 15 $\blacktriangle I/\blacktriangle X$ signals 53 through 55 so that the 15 output signals 72 through 86 are generated for the other 15 pixels 23—23 of the group 25—25. Referring to FIG. 3, it can be appreciated, then, that the delta added to or subtracted from the reference value R (pixel 28) increases with increased distance of a given pixel 23—23 in the group 25—25 from the reference pixel 28. FIG. 3 shows the reference value R varying from $R - 2\blacktriangle$ for the P1 pixel 23 to $R + 17\blacktriangle$ for the P20 pixel 23.

Referring again to FIG. 4, another adder 87 is connected to receive a signal 88 (representing $20 \blacktriangle I_R / \blacktriangle X$) and the output signal 49 (representing the value $I_R$ of the reference pixel 28). The adder 87 supplies a next reference pixel signal 89 representing the value of the reference pixel 28 in the next successive group 25—25 (shown as group 25B in FIG. 2) of pixels 23—23 along the scan line 24.

The first and second adder stages 45 and 46 are cycled so that the various output signals 47 through 51 and 72 through 86 are serially generated for the next successive group 25B (FIG. 2) of pixels 23—23. The determination of the value of the next reference pixel 28 of the group 25B and the cycling of the first and second adder stages 45 and 46 continues until the red component intensity values $I_R$ of all the relevant pixels 23—23 in a particular one of the scan lines 24 have been determined. A similar process is performed in each of the blue and green component sections 31 and 32 and in the z section 33 for that particular scan line 24. A next scan line 24 is then processed until there are no more scan lines 24 through which the polygon 27 extends.

RED COLOR COMPONENT SECTION 30

Still referring to FIGS. 4 and 5, as indicated above there are four sections 30 through 33 of the pixel control system 20. Since the respective red, blue, and green component sections 30, 31 and 32 are the same, only the red section 30 will be described in detail. The red section 30 includes a holding register 90 and an A bus 91 for supplying the input signal 37 representing the 16 bit word 36 for the red reference value $I_R$. Upon completion of the processing by the pixel control system 20 of a given scan line 24, the red reference holding register 90 inputs the 16 bit word 36 (FIG. 8) representing the reference value $I_R$ to a red reference register 92 that has 16 places, one for each bit of the red reference signal 37. The red reference register 92 is controlled to successively or serially output the 16 bits of the word 36 representing the red intensity $I_R$, starting with the least significant bit (LSB) and ending with the MSB. This 16 bit word 36 represents the red intensity value $I_R$ of the P3 (or reference) pixel 28 in the first group 25—25 (group 25A in FIG. 2) of pixels 23—23 along a given scan line 24.

The A bus 91 is also connected to a delta holding register 93 that receives the input delta signal 41 representing the 16 bit word 36 for the value of $\blacktriangle I_R / \blacktriangle X$. For ease of reference, $\blacktriangle I_R / \blacktriangle X$ will be referred to as "$\blacktriangle R$" and is shown in the drawings as "$\Delta$". $\blacktriangle R$ thus represents the amount by which the value of the reference pixel 28 for the red component varies from pixel 23 to pixel 23 within a given 20 pixel group 25—25 of pixels 23—23 and further across a given scan line 24. When used with respect to sections 31 through 33, the terms "$\blacktriangle R$" in the description and "$\Delta$" in the drawings refer to the respective changes in intensity $I_B$ and $I_G$ and depth $\blacktriangle z / \blacktriangle X$.

One object of the pixel control system 20 is to minimize the number of machine cycles required for adding $\blacktriangle R$ to the input reference signals 37 through 40 so as to generate the output signals 47 through 51 and 72 through 86 for the 20 pixels 23—23 in a group 25—25, where the values of the respective output signals increase by $\blacktriangle R$ on a pixel by pixel basis starting with the leftmost pixel 23 of the particular group of pixels 25—25.

Referring again to the red section 30 as shown in FIG. 4, the delta holding register 93 is sequenced to input the input delta signal 41, in the form of the 16 bit word 36 representing $\blacktriangle R$, into a delta shift register 94. The delta register 94 is cycled to input to the rest of the red section 30 of the pixel control system 20 the 16 bit word 36 on a bit by bit basis starting with the LSB. The delta register 94 is also connected to an associate or extension shift delta register 95 that is effective to store multiple values of ▲R. In particular, there are four register locations in the extension delta register 95 and these store 2▲R, 4▲R, 8▲R and 16▲R, respectively. Such extension delta register 95 stores such amounts in the same clock cycle as the delta register 94 receives and stores the 16 bit word 36 representing ▲R. It may be appreciated then that the delta shift register 94 and the extension shift delta register 95 combine to provide signals 96, 97, 98, 99 and 100 respectively to the first adder stage 45 that are in either a unitary ▲R value or selected multiples of the ▲R value. More particularly, the signals 96 through 100 represent ▲R, 2▲R, 4▲R, 8▲R and 16▲R, respectively.

One portion of the first adder stage 45 is formed by a series of three serial adders 101, 102 and 103. The first adder 101 of this series is connected to the delta register 94 for receiving the unitary ▲R signal 96. Such adder 101 is also connected to the extension delta register 95 to receive the 4▲R signal 98. Thus, the serial adder 101 is effective upon being cycled to generate the 5▲R signal 53 for use in the second adder stage 46 (FIG. 5) of the pixel control system 20. The second serial adder 102 of the series is connected to the extension delta register 95 for receiving the 2▲R signal 97 and the 8▲R signal 99. As a result, when the serial adder 102 is cycled, the 10▲R signal 54 is produced. The third serial adder 103 of the series of adders performs a subtraction operation and receives the unitary ▲R signal 96 from the delta register 94 and the 16▲R signal 100 from the extension register 95. Thus, when the adder 103 cycles, it produces the 15▲R signal 55.

Still referring to the first adder stage 45, a serial adder 104 is connected to the reference register 92 to receive the 2▲R signal 97 from the extension delta register 95 and the input signal 37 from the reference register 92. As a result, when the first adder stage 45 cycles, the R+2▲R signal 51 is generated.

The first adder stage 45 also includes a serial adder 105 that receives the reference signal 37 and the unitary R signal 96 from the delta register 94. Upon cycling, the serial adder 105 provides the R+1▲R signal 50.

A third adder 106 of the first adder stage 45 is a register that effectively adds 0▲R to the value of the reference signal 37 and upon cycling outputs the R signal 49.

A fourth serial adder 107 of the first serial adder stage 45 performs a subtraction operation and receives the input reference signal 37 and the 1▲R signal 96 from the delta register 94. As a result, upon cycling the R minus 1▲R signal 48 is generated.

A fifth serial adder 108 of the first adder stage 45 also performs a subtraction function using the reference signal 37 and a 2▲ signal 97 from the extension delta register 95 to generate the R minus 2▲R signal 47.

Referring in detail to FIG. 5, these five signals 47 through 51 and the 5, 10, and 15▲R signals 53 through 55 are selectively applied to the second adder stage 46 of the pixel control system 20. In particular, the 5▲R signal 53 is added to each of the respective signals 47 through 51 output from the adders 104, 105, 106, 107, and 108. The same is done with 10▲R signal 54 and the 15▲R signal 55 to generate the 15 output signals 72 through 86 representative of the red intensity values of the P6th through the P20th pixels 23—23 of the first group of pixels 25—25. In greater detail, the second stage 46 includes the parallel array 56 of the 15 adders 57 through 71, which are arranged in parallel in three columns or banks 109, 110 and 111. The first bank 109 includes the adder 57 that receives the 5▲R signal 53 and the R+2▲R signal 51 from the adder 104 and generates the additional output signal 76 of R+7▲R value (FIG. 3) for the P10 pixel 23—23. In a similar manner, the next adder 58 of the first bank 109 is connected in parallel to receive the 5▲R signal and the R+1▲R signal 50 and outputs the R+6▲R signal 75 which represents the value of the P9th pixel 23—23. The next adder 59 of the 5▲R bank 109 receives the 5▲R signal 53 and the R signal 49 to generate the output signal 74 representing R+5▲R, the value of the P8 pixel 23—23. Similarly, the adder 60 in the first bank 109 receives the R−▲R signal 48 and the 5▲R signal 53 and produces the R+4▲R signal 73 for the P7 pixel 23—23. Similarly, the adder 61 of the first bank 109 receives the 5▲R signal 53 and the R−2▲R signal 47 and produces the output signal 72 representing the value R+3▲R of the P6 pixel 23—23.

It may be understood that the second bank 110 of adders 62 through 66 receives the 10▲R input signal 54. The respective ones of the adders 62, 63, 64, 65 and 66 receive the respective R−2▲R, R−▲R, R, R+▲R and R+2▲R signals 47, 48, 49, 50 and 51 to respectively produce the output signals 77, 78, 79, 80 and 81 representing respective values for the P11th through P15th pixels 23—23 of R+8▲R, R+9▲R, R+10▲R, R+11▲R, R+12▲R.

In a similar manner, the third bank of adders 111 includes the adders 67, 68, 69, 70 and 71 that each receive the 15▲R signal 55. The adders 67 through 71 of the third bank 111 are selectively connected in parallel to respectively receive the R+2▲R signal 51, the R+▲R signal 50, the R signal 49, the R−▲R signal 48 and the R−2▲R signal 47. The adders 67 through 71 respectively generate the output signals 86, 85, 84, 83 and 82 representing the values of the P20th through the P16th pixels 23—23 in the group 25—25. The values of the output signals 82 through 86 are respectively R+13▲R through R+17▲R.

Because the output signals 47 through 51 are generated by the first adder stage 45, which is one machine cycle ahead of the second adder stage 46 that generates the output signals 72 through 86, a register 112 is provided for storing the output signals 47 through 51. As the signals 72 through 86 are output from the second stage 46, the register 112 is cycled to output the signals 47 through 51 so that 20 output signals 47 through 51 and 72 through 86 are generated to represent each of the P1 through P20 pixels 23—23 of a particular group 25—25.

The pixel control system 20 is then rendered effective to generate the output signals 47 through 51 and 72 through 86 for the next group 25—25 of pixels 23—23 if the next group 25—25 is relevant to the polygon 27 being processed. Referring to FIG. 4, for this purpose, when the first group 25—25 of 20 pixels 23—23 has been processed the reference register 92 is provided with the next reference signal 89 representing the value of the reference pixel 23—23 of the next group 25—25 of 20 pixels. FIG. 2 identifies the prior group 25—25 using the reference 25A, whereas the next group 25—25 has the reference 25B.

The next reference signal 89 is provided by the serial adder 87 that receives both the reference signal 49 from the register 106 and the 20▲R signal 88 from a serial adder 114. The adder 114 is in turn connected to receive the respective 4▲R and 16▲R signals 98 and 100 from the extension delta register 95. The adder 114 provides the 20▲R signal 88 during the first machine cycle and the adder 87 produces the R+20▲R next reference signal 89 at the end of the second cycle. The R+20▲R signal 89 is input to a holding register 115 that outputs the R+20▲R signal 89 at the end of the third cycle. As a result, during the fourth through the 19th cycles, the full 16 bit depth of the word 36 for the R+20▲R next reference signal 89 representing the value of the next reference pixel 28 is input into the reference register 92 as the reference register 92 outputs the last of the 16 bits of the word 36 for the first reference signal 37.

When the 20th machine cycle occurs, the normal shifting of the reference register 92 and the delta register 94 is inhibited, and the multiple delta values stored in the extension delta register 95 are cleared to 0, awaiting input of more delta values from the delta register 94.

BLUE/GREEN COLOR COMPONENT SECTIONS 31 AND 32

As indicated above, the red, blue and green sections 30, 31 and 32, respectively of the pixel control system 20 are the same and function in parallel with each other so that the red signals 47 through 51 and 72 through 86 and corresponding blue and green output signals (shown as 116 and 117 in FIG. 4) representing the 20 pixels 23—23 to the 16 bit depths of each pixel 23—23 are output in synchronism to the memory 34.

Z DEPTH SECTION 33

The z depth section 33 is different from the respective red, blue and green sections 30, 31 and 32 primarily because a 32 bit word 118 (FIG. 9) represents the depth value of a particular pixel 23. Because the 32 bit word 118 requires twice as many cycles to process as the 16 bit word 36 requires, the depth section 33 is provided in two parts, shown as section 119 for z0 and section 120 for z1. The processing of the depth values z0 and z1 is alternated so that the two sections 119 and 120 work simultaneously but 20 bits out of phase. Further, the depth extension register 95 has a 32 ▲ output (shown in dashed lines in FIG. 4) and the delta register 93, the delta shift register 94, the reference holding register 90 and the reference register 92 are each 32 bits wide for processing z0 and z1.

Each 20 machine cycles the depth sections 119 and 120 alternately output a 32 bit deep output signal 121 at the same time as the color component sections 30, 31 and 32 generate the 16 bit deep signals 47 through 51 and 72 through 86. The signals 47 through 51 and 72 through 86 from the color component sections 30 through 23 are respectively shown in FIG. 4 as a signal 122 for red, the signal 116 for blue and the signal 117 for green. Considering the red signal 122 as an example, the respective 16 bit values for the 20 pixels 23—23 are input to an output register 123 that is 20 pixels wide to simultaneously store one bit of each of the 20 output signals 122. As each of the fourth through 19th cycles occurs, a bit representing each of the 20 pixels 23—23 is output to a red input register 124 of the memory 34. The input register 124 is eight bits deep, such that only the eight MSB that are received from the red output register 123 are stored in the input register 124. In a similar manner, the blue output signal 116 and the green output signal 117 are stored in comparable output registers 123 and then input to respective input registers 125 and 126 of the memory 34. The writing of the red, blue and green output signals 122, 116 and 117 respectively into the memory 34 is controlled by a selection circuit 127 that is shown in detail in FIG. 6.

In respect to the depth sections 119 and 120, in selected cycles of the pixel control system 20 following the third cycle, the first through 32nd bits that are stored in the depth reference register 92 and the depth delta register 94 are processed bit by bit such that the respective 32 bit values of the depth output signal 121 for each of the 20 pixels 23—23 are input to the depth output register 123 that is 20 pixels wide. Thus, as selected ones of the fourth through 32nd cycles occurs, a bit representing each of the 20 pixels 23—23 is output to the selection circuit 127. In response to the z0 and z1 output signals 121 from the output register 123, the selection circuit 127 performs a z buffer operation that selects data for a previously processed polygon (not shown, but referred to as $27^1$) or the currently processed polygon 27 depending on which is closer to an observer along the field of view. This is done on a scan line and pixel by pixel basis. Thus, if the prior polygon $27^1$ is closer, respective red, blue, green and depth output signals $122^1$, $116^1$, $117^1$ and $121^1$ (FIG. 6) remain in the memory 34 instead of being overwritten by the signals 122, 116, 117 and 121 for the current polygon 27. Also, subject to the control of the selection circuit 127, the depth output signal 121 for the current polygon 27 may be written into a z buffer section 128 of the memory 34 or the depth output signal $121^1$ for the prior polygon $27^1$ may remain in the z buffer section 128. The z buffer section 128 is 16 bits deep, such that only the sixteen MSB that are received from the z0 and z1 output registers 123 are stored. The selection circuit 127 is described further below.

SEQUENCE CIRCUIT 129

Referring to FIG. 10, the pixel control system 20 also includes a sequence circuit 129 that generates timing signals 130 and instruction signals 131 for controlling the other elements of the pixel control system 20. The sequence circuit 129 also monitors the particular group 25—25 of pixels 23—23 that the various red, green, blue and depth sections 30, 31, 32 and 33 are processing at any given time. For example, when the leftmost group 25—25 has been processed and there is no center group 25—25 between the leftmost group 25—25 and a rightmost group 25—25, a WDC=0 group control signal 132 causes the sequence circuit 129 to have the respective red, blue, green and z sections 30 through 33, 119 and 120 process the next group as the rightmost group 25—25. Also, in providing a "fill" function, the sequence circuit 129 identifies the leftmost group 25—25 of pixels 23—23, the rightmost group 25—25 of pixels 23—23 and the pixels 23 within each such group 25—25 that will be OFF because they are outside of the polygon 27.

Referring to FIG. 10 in conjunction with FIGS. 11A through 11C, the sequence circuit 129 is shown including a sequencer 133 (FIG. 11B) that includes a PROM section 134 and a register section 135. The PROM section 134 includes a plurality of parallel connected PROMs 136, 137, 138 and 139 where the number of such PROMs 136–139 that is provided depends upon the number of outputs required for controlling the pixel control system 20. In the preferred embodiment of the present invention the four PROMs 136, 137, 138 and 139 are provided and each is connected to a register 140, 141, 142, and 143, respectively, of the register section 135.

Still referring to FIGS. 10 and 11B, the operation of the pixel control system 20 is divided into "states" that are identified by a four digit octal number, e.g. "0040". Each state is identified by an address and has a next address associated with it. In response to a next address signal 144 associated with a prior state, FIG. 11B shows NXTADR0 through NXTADR5 next address signals 144 applied to the PROM section 134 to cause the PROM section 134 to output the signals 131 representing the instructions corresponding to the next address. The instruction signals 131 are written into the register section 135 to cause the register section 135 to output the instruction signals 131 to a clock circuit 145 (FIG. 11C), to a word counter circuit 146 (FIG. 11A) and a FUNCA CTR counter circuit 147 (FIG. 11A).

Also in response to the next address signal 144 of the prior state, the PROM section 134 generates next address signals 144 for the next state. Such signals 144 are input to the register section 135 and are then output in a loop to the PROM section 134 to cause the next state to be processed. Each of the four PROMs 136 through 139 has the next address signals 144 applied to it. The next address signals 144 are in binary form and cause each of the PROMs 136 through 139 to output the next, next address signal 144. The combined binary pattern on the six lines 148 that provide the next address signals 144 determine the particular next address that is applied to the PROM section 134. The PROM section 134 then outputs the next, next address signal 144 to the register 140 on the next cycle.

Each of the specific respective instruction and next address signals 131 and 144 from the registers 140, 141, 142 and 143 relates to particular instructions that are listed on the computer program listing attached as Appendix A.

Referring still to FIGS. 11A through 11C, there are three other inputs 149, 150 and 151 to the PROM 136 that also cause the PROM 136 to output certain instruction signals 131 and next address signals 144. Also, a *CONT signal 152 may also be input to the PROM 136 from an AND gate 153 that responds to a *GO ACC input signal 154 and an ENADISP instruction signal 131 from the register 142.

Referring to FIG. 11C, an oscillator (not shown) provides a main clock or *CLKSHADER signal 156 to an input 157 of the clock circuit 145. All of the clock signals for the system 20 are derived from the *CLKSHADER clock signal 156. The *CLKSHADER signal 156 is a negative going input pulse that is applied to a network 158 of parallel NAND gates 159 through 161 and inverters or buffers 162 through 164. The *CLKSHADER signal 156 is first applied to an inverter 165 that inverts the signal 156 to form a positive going pulse. The inverter 165 applies the inverted *CLKSHADER signal 156 to the network 158. Inhibit signals 166, 167 and 168 are added to the clock signal 156 by the NAND gates 159 through 161 to provide the clock or timing signals 130. In the absence of an inhibit signal 166–168, each NAND gate 159 through 161 receives two high (or positive going) pulses and provides an inverted negative going output in the form of the timing signals 130 so that the function that is controlled by the timing signal 130 will occur (i.e. is not inhibited). On the other hand, to prevent a function from occurring, the *INHIBIT RGB inhibit signal 167, for example, is applied to the NAND gate 161 as a negative going pulse that coincides with the positive going *CLKSHADER clock signal 156 to produce a positive going output pulse in the form of the *CLK1X2XRGB timing signal 130 such that the timing signal 130 is high or positive and is not effective to shift the register 93, for example, of the red section 30.

In a similar manner, the inhibit signals *INHZ0 and *INHZ1 166 and 168 respectively, are respectively applied to the NAND gates 159 and 160 to be added to the main clock signal 156. In the same manner as described above, the NAND gates 159 and 160 are controlled to either provide a timing signal 130 that is positive or negative going such that in the case of the negative going output of the NAND gate 160 the *CLK1X2XZ0 timing signal 130 will not be generated, for example.

For controlling other operations of the sequence circuit that must be operated each cycle, thus that are not to be inhibited, the inverter 165 outputs the *CLKSHADER signal 156 to the additional inverters 162, 163 and 164 which invert the signal 156 so that the outputs are the inverted respective *CLK1X2XPR, *CLK1X2XPG and *CLK1X2XPB cyclic signals 169.

In a manner similar to that described above, NAND gates 170 and 171 receive selected ones of the *INHZ0 and *INHZ1 signals 166 and 168 respectively for selectively generating the *CLK1X2XPZ0 and *CLK1X2XPZ1 timing signals 130. Similarly, inverters 172 through 177 receive the clock signal 156 through an inverter 178 for generating the respective *CLK1X2XP0, *CLK1X2XP1, *CLK1X2XP2, *CLK1X2XP3, *CLK1X2XP4 and *CLK1X2XP5 cyclic signals 169.

Referring to FIGS. 10 and 11A, the cyclic signals 169 are shown applied to the FUNCA CTR counter 147. The FUNCA CTR counter 147 monitors the processing by each of the depth sections 119 and 120 and the red, green and blue sections 30, 31 and 32 respectively as they process their respective 32 MS and LS and 16 MS and LS bits of data as described above. In greater detail and referring to FIG. 11A, the FUNCA CTR counter circuit 147 includes a counter 179 connected to a programmable array logic circuit (PAL) 180. The operation of the FUNCA CTR counter circuit 147 is initiated by the *STARTZOUTEN instruction signal 131 from the register 143 of the sequencer 133. The *STARTZOUTEN instruction signal 131 is input to the counter 179 at the same time as the *CLK1X2XP2 cyclic signal 169 is input so that the counter 179 is reset to 0 or cleared. At a later time the *ENFUNCACNT instruction signal 131 is output by the register 141 to the counter 179, which enables the counter 179 to start counting. When the counter 179 is enabled, it counts up to a set amount. For each number counted by the counter 179 there is a specific output that indicates that a given cycle has been counted. The counter 179 counts up to 15 and then is stopped by the *ENFUNCACNT instruction signal 131. The counter 179 is then reset by the *STARTZOUTEN instruction signal 131.

The outputs from the counter 179 represent any one of the machine cycles 0 through 15, and cause the programmable array logic circuit (PAL) 180 to output selected FUNCA output signals 181. In particular, at the end of Appendix A under the heading "FUNCA COUNTER", there is a listing of the operations performed by the FUNCA CTR circuit 147. Since these involve the details of the memory 34, reference is made to FIGS. 12 and 16.

MEMORY 34

FIGS. 12 and 16 depict the memory 34 in the form of a bit plane memory 182 having a series 183 of eight planes 184 for the red color component, a series 185 for the blue color component and a series 186 for the green color component. The z buffer section 128 of the bit plane memory 182 includes a series 187 for the z LS and a series 188 for the z MS to complete the bit plane memory 182. Each plane 184 of the red series 183 has one of the input registers 124 shown in FIG. 4. Each input register 124 has twenty storage locations to correspond to the 20 pixels 23—23 of a group 25—25. In a standard manner, each of the planes 184 includes twenty data storage chips such as a DRAM device 189. Each DRAM 189 has data storage locations 190 (FIG. 12) that have a particular row and column address. A given pixel 23—23 on the screen 21 has an address that corresponds to a given row and column address in the DRAM 189.

The blue series 185 and the green series 186 are similarly structured and have the respective input registers 125 and 126. The z series 187 and 188 are also similar and have an input register 192 for receiving the depth output signals 121.

Referring to FIG. 12, one of the DRAMs 189 is shown connected to a row/column address register 191 that receives memory address signals 131 from a counter (not shown) that is controlled by the sequencer 133. The register 191 supplies row and column addresses to the DRAMs 189 to identify the data storage location 190. The DRAMs 189 also receive SBPMRAS and SBPMCAS signals 181 from the FUNCA CTR circuit 147 that strobe the DRAMs 189 in a well known manner to condition the addressed storage location 190 to receive data in the form of the 8 MS bits of the red output signal 122. Similar arrangements are provided for the blue series 185, the green series, 186 and the z LS and z MS series 187 and 188, respectively. The row/column address register 191 is controlled by the LDBPM signal 181 from the FUNCA CTR circuit 147.

To illustrate the operation of the bit plane memory 182, the red input register 124 is also shown in FIG. 12. The FUNCA CTR counter circuit 147 coordinates the processing by the red section 30, for example, with the writing of the output signals 122 out of the register 123 into the red memory input register 124 and from such input register 124 into the bit plane memory 182. In particular, as the eight LS bits of the output signals 122 are being read from the register 123, the counter 179 does not directly output a SLDINREG signal 193 (FIG. 11A) that is in parallel with the PAL 180. The signal 193 represents the MS bit of the output of the counter 179. As described below, this disables the input register 124 of the memory 34 during each processing of each of the eight LS bits.

After the eight LS bits, the SLDINREG signal 193 enables the decoding of three other SFUNCA0, SFUNCA1 and SFUNCA2 signals 194, 195, 196 from the counter 179 by applying such signals to a three to eight decoder 197. The three to eight decoder 197 allows the three signals 194, 195, and 196 (FIG. 11A) to cause the selection of one of eight possible output signals 198. The output signals 198 select one of the eight red bit plane input registers 124 of the red series 183. This is done for each of the series 183 and 185-188. The selected input register, such as the red input register 124, is loaded with one bit for each of the twenty pixels 23—23 of a group 25—25. As each next input register is selected, another of the eight MS bits of the respective red, green, and blue signals 122, 116, and 117 and another of the eight LS and MS bits of the signals 121 are loaded into the corresponding input register. It may be appreciated then, that when the SLDINREG signal 193 (FIG. 11A) is not output, that all of the input registers 124 will be disabled so that none of the eight LS bits of the output signal 122 will be loaded into the input register 124. The disabling of the input registers 125, 126 and 192 has a similar result.

Having thus input the MS bit output signals 122, 116 and 117 into respective input registers 124, 125, and 126, and the sixteen integral MS and LS bits of the depth output signal 121 into the input register 192, an SWRT signal 181 is output from the PAL 180 of the FUNCA CTR circuit 147.

The last output signal 181 generated by the PAL 180 is the S DONE signal 181 that, as shown in FIG. 10, is applied to the sequencer 133 to cause the sequencer 133 to output the instruction signals 131 and the timing signals 130 for the next state.

Referring now to FIG. 13, there is also shown a decoder 199 (FIG. 13) having a plurality of inputs 200 for receiving various signals 201 from a unit (not shown) that is connected to the pixel control system 20. The decoder circuit 199 is formed from programmable array logic that responds to a signal 201 applied to the inputs 200 to perform a specific control function within the pixel control system 20. For example, in response to a combination of input signals 201, the decoder circuit 199 generates a LDZ1DREG0 signal 202 for enabling the shift register 94 to receive the 16 bits of the red R signal 41 from the A bus 91.

Other decoders 199 are provided and output the following signals 202 in response to a combination of signals 201 as listed in Chart 2 below:

| Chart 2 FDECODE PAL 199 | |
|---|---|
| Signal 201 | Signal 202 |
| VPMDSEL0 | LDRBREG |
| VPMDSEL1 | LDRDREG |
| VPFUNCA0 | LDGBREG |
| VPFUNCA1 | LDGDREG |
| VPFUNCA2 | LDBBREG |
| VPFUNCA3 | LDBDREG |
| VPMDSEL0 | *LDGO |

The LDRBREG and LDRDREG signals 202 are applied to the respective red reference holding register 90 and red delta register 93 shown in FIG. 4 and in greater detail in FIG. 14. The LDBREG and LDGDREG signals 202 and LDBBREG and LDBDREG signals 202 are applied in a similar manner to the green and blue sections 31 and 32 respectively.

CONTROL OF REGISTERS OF SECTION 30

Referring to FIG. 14 in conjunction with FIG. 4, it may be understood that the red holding register 90 and the red register 92 are 8 bit shift registers 203 that have input latches. The registers 90 and 92 are shown in FIG. 14 as the single register 203 for 8 bits of the 16 bit input signal 37. A separate 8 bit shift register 204 is provided for the other 8 bits of the input signal 37. Each of the 8 bit registers 203 and 204 has 8 bits of the input signal 37 input to it on the respective A BUS 0 through A BUS 7 input lines 205 or A BUS 8 through A BUS 15 input lines 206. Further, as other inputs 207 to the registers 90 and 92 formed by the units 203 and 204, the CLK1XP0 timing signal 130 and the LDRBREG signal 202 from the decoder 199 are anded by a NAND circuit 208 to shift the data from the A BUS 91 into the holding registers 90 of the 8 bit registers 203 and 204. Further, another input 209 to each of the 8 bit registers 203 and 204 is the *LDRGB instruction signal 131 (FIG. 11C) that is effective to shift the data from the holding register 90 into the register 92. Finally, the *CLK1X2XRGB timing signal 130 is cycled to shift all 16 bits of the input signal 37 to the adders 104 through 108 of the first stage 45.

Still referring to FIG. 14, it may be understood that the red delta register 93 and the red delta shift register 94 for the red delta signal 41 are formed from two 8 bit shift registers 210 and 211 that have input latches that may be the same type of register as was used for the registers 203 and 204 of the reference holding register 90 and the reference register 92. Thus, the A BUS 91 inputs 0 through 15 are shown for applying the delta red input signal 41 to the 8 bit shift registers 210 and 211. Further, the same timing signals 130 and the LDRDREG signal 202 are applied to a NAND circuit 212 that shifts the data into the delta register 93. The *LDRGB instruction signal 131 is applied to an input 213 to shift the data into the delta shift register 94. The *CLK1X2XRGB timing signal 130 is applied to an input 214 to shift all 16 bits of the red delta input signal 41 to the extension register 95 in synchronism with the 16 bits of the input signal 37. However, the delta register 93 and delta shift register 94 also have the extension register 95 which is shown as a register unit 215 having four registers integrally within it and shown by dashed lines. The unit 215 is a 4 bit bi-directional universal shift register. As shown in FIG. 4, the extension register 95 has a fifth 32Δ section, such that for the depth section 33, the register unit 215 has an additional register within it. Simultaneously with the *LDRGB signal 131 input to the registers 90 and 92, the LDRGZB signal 131 (see LDRGBZREGS in FIG. 11B) from the sequencer 133 is input to the extension register unit 215 to load it with 0 values in anticipation of receiving the data from the delta register 93 and the delta shift register 94. Also simultaneously with the *CLK1X2XRGB signal 130 input to the registers 93 and 94, the *CLK1X2XPR0 signal 130 is applied to the extension register unit 215 so that the data from the shift register 94 is shifted into the extension register unit 215. In successive cycling of the extension register unit 215, the 2▲, 4▲, 8▲ and 16▲ signals 96 through 100, respectively, are output. In respect to the depth section 33, the extension shift register unit 215 also outputs a 32Δ signal 217.

The control of the section 30 may be further understood by referring to FIG. 15 where the adders 68, 69, 70 and 71 are shown formed from a quad-serial adder 218. The quad "-" serial adder 218 effectively provides the functioning of the serial adders 68, 69, 70 and 71 shown in FIG. 5. The quad-serial adder 218 is cycled to provide the add function in response to the *CLK1X2XPR timing signal 130. The quad-serial adder 218 is cleared by the *CLRRED signal 131 from the PROM 141 (output 15, FIG. 11B).

CONTROL OF REGISTERS 112 AND 123

Referring now to FIG. 4 in conjunction with FIG. 17, the operation of the output registers 112 and 123 of each section 30-33 may be understood. As an example, FIG. 18 shows the red section output registers 112 and 123, it being understood that the respective blue, green and depth sections 31-34 are similar.

The output register 112 is shown having inputs 220 for receiving the output signals 47-51. In response to a *CLK1X2XPR timing signal 130, the output signals 47-51 are input to selected ones of three programmable array logic (PAL) circuits 221, 222 and 223, that are also cycled in response to the *CLK1X2XPR timing signal 130. Taking the circuit 221 as an example, it is a PAL and not a register in the preferred embodiment of the present invention because different pixels 23—23 on a particular scan line 24 at one location on the screen 21 have different storage address relationships than other pixels 23—23 that are at different locations on the screen 21. Such relationship is defined by signals 224 input from a unit (not shown) connected to the pixel control apparatus 20. A buffer 225 provides the signals 224 to the PALS 221, 222 and 223 to cause them to transform the various output signals 122, 116, 117 or 121 according to the desired address relationship. When cycled by the *CLK1X2XPR signal 130, each of the PALS 221, 222 and 223 supplies the transformed output signals 122, 116, 117 and 121 to an S BUS 225[1].

SELECTION CIRCUIT 127

As described above, the selection circuit 127 (FIG. 4) selects the signals 122, 116, 117 and 121 from the S BUS 225[1] for a current polygon 27 or leaves in the memory 34 prior signals 122[1], 116[1], 117[1] and 121[1] from a polygon 27[1] that was previously processed. In greater detail, referring to FIG. 6, the depth signal 121 for the current polygon 27 is applied to a comparator 226 for comparison to the depth signal 121[1] for the previous polygon 27[1]. The depth signal 121[1] is output from the z buffer section 128 to the comparator 226. The comparator 226 performs a standard z buffer operation and outputs a z selection signal 227 indicating, according to which polygon 27 or 27[1] was nearer the observer, whether the data for the current pixels 23—23 or for the prior pixels 23[1]—23[1] are to be stored. The signal 227 is applied to a programmable array logic circuit 228 that is programmed to further select the pixels 23—23 or 23[1]—23[1] at that part of the scan line 24 according to whether they are inside the current or prior polygon 27 or 27[1] and are thus to be displayed (or QN), or whether they are outside and will not be displayed. The basis for such selection is a signal 229 from registers 230, 231 and 232 that correspond to a group 25—25 that is intersected by a left edge of the polygon 27, or that is inside the polygon 27 or that is intersected by a right edge of the polygon 27. As appropriate to the data represented by the signal 229, the PAL outputs a write enable signal 233 that is applied to a NAND circuit 233[1] with the SWRT signal 181 from the PAL 180 (FIG. 11A) to cause the signals 122, 116, 117 and 121 to be written over the prior data in the bit plane memory 182 and z buffer section 128 if the current pixel 23 is closer to the observer. If not, no write enable signal 233 is output, and the signals 122[1], 116[1], 117[1] and 121[1] for the prior pixel ADDRESS 23[1] remain in such storage.

The operation of the selection circuit 127 may be controlled by the FUNCA counter circuit 147 and may be understood by reference to the "FUNCA COUNTER" section of Appendix A. The ENABLE MEMORY READ instruction is derived from the SFUNCA02 signal 196 to cause the z signal 121[1] to be read from the z buffer section 128. The ENABLE MEMORY ADDRESS COUNT instruction allows a new address to be selected in the z buffer section 128 and the ENABLE MEMORY ADDRESS COUNT UP instruction allows the count of the memory address input to the register 191 (FIG. 12) to count up to the next memory location. The ENABLE MEMORY WRITE instruction provides the write enable signal 233 to allow the output signals 122, 116, 117 and 121 to be written into the memory 34.

WORD COUNTER CIRCUIT 146

Referring to FIG. 11A, the word counter circuit 146 is shown including first and second counters 234 and 235 that receive eight signals 236 that represent the number of groups 25—25 that are between the opposite sides of the polygon 27 and not intersected by an edge between pairs of vertices 29—29, which groups 25—25 are the central groups. A *LDWDCNT instruction signal 131 enables the counters 234 and 235 to receive the eight signals 236. An *ENWDCNT signal 131 is also applied to the counters 234 and 235 to enable them to decrement one number in response to a *CLK1X2XP1 timing signal 130. The counters 234 and 235 output a signal 237 that is nanded with an *ENWDDLSP signal 131 by a NAND circuit 238 to generate a WDCNT-0 signal 238 that is applied to the input 151 of the sequencer 133 (FIG. 11B). Another signal 239 generated by the counter 235 is applied to another NAND circuit 240 with the *ENWDDISP instruction signal 131 to generate a group control signal 132 as a WDCNT-1 signal 241 that is applied to the input 150 of the sequencer 133.

OPERATION OF PIXEL CONTROL SYSTEM 20

Referring to FIG. 18, the states of the program listed in Appendix A are arranged into functional groups. The program initiates the processing of a scan line 24 to control the intensity of the pixels 23—23 that are at the edge of or inside the object 26. Such pixels 23—23 may be in only one group 25—25 when the edges of the polygon 27 that have a common vertex 29 extend through pixels 23—23 in only one group 25—25, such as shown in FIG. 1. The edges of the polygon 27 may also extend through separate, adjacent groups 25—25 of pixels 23—23 on a scan line 24, such that there is no center group 25—25. The edges of the polygon 27 may extend through groups 25—25 that are spaced from each other by one or more center groups 25—25.

After an idle state 1040, the program starts the z0 section 119 to provide the head start noted above. This is completed at state 0160.

State 0051 starts the sections 30, 31, 32 and 120, which are completed by state 0021 such that the output signals 122, 116, 117 and 121 have been generated for red, green, blue and z0 for the pixels 23—23 in the leftmost group 25—25 along the scan line 24 and stored in the input registers 124, 125, 126 and 192. In states 0056 to 0120, the comparison has taken place in the comparator 226.

At the end of state 0021, there are three possible branches according to whether there are more than two groups 25—25 (state 0001), whether the leftmost group 25—25 is the only group on that scan line 24 that the polygon edges extend through (state 0201), or whether there are only two consecutive groups 25—25 (state 0401).

State 0001 starts the processing of a center group 25—25 through state 0026, where there is a branch to state 0002 if there are more center groups 25—25 or to state 0401 if only the right group 25—25 is left to process.

The right side is processed in states 0401 through 0017 where the z1 section 120 has output its 32 bit output signal 121 in synchronism with the sections 30-32, or in states 0402 through 0007 where the z0 section 119 has output its 32 bit output signal 121 in synchronism with the sections 30-32.

The pixel control system program then returns to the idle state 1040.

In greater detail, the program initiates the idle state 1040 which causes the sequencer 133 to cause the clock circuit 145 to generate the *INHZ0, *INHRGB and *INHZ1 inhibit signals 166, 167 and 168 respectively. These signals 166, 167 and 168 prevent the red, green, blue and depth sections 30, 31, 32 and 33 from functioning. Thus, the first and second adder stages 45 and 46 of the respective red, green, blue, z0 and z1 sections 30 through 33 are not cycled and await the input GO ACC signal 154 (FIG. 11B) that will initiate the processing of a scan line 24.

The idle state 1040 includes four instructions. Since the idle state 1040 loops until the GO ACC input signal 154 is received by the sequencer 133, reference is made to the DISP[*GO ACCESS(9)] instruction, which causes the ENADISP instruction signal 131 from the register 143 to be applied to the AND gate 153. This conditions the sequencer 133 to be responsive to the input GO ACC signal 154. When the AND gate 153 receives both the ENADISP instruction signal 131 and the GO ACC input signal 154 it outputs the *CONT signal 152 which is effective to change the address applied to the PROMs 136 through 139. As a result, the ENADISP signal 131 is no longer generated. Thus, the AND circuit 153 will not respond to another GO ACC signal 154 until the sequencer 133 is controlled to generate another ENADISP signal 131.

The GO ACC signal 154 initiates the processing. This occurs while the red, green, blue and depth z1 sections 30 through 33 respectively have been inhibited by the inhibit function. The first part of the processing is to prevent the red, green, blue and depth z1 sections 30 through 33 respectively from operating so that the first 16 z0 ls bits will be output when red, green, blue and depth z1 sections 30 through 33 respectively start being processed. In this way, during the processing of the 16 LS bits of z1 and the 16 bits of red, green and blue, the 16 MS bits of z0 will be output to the register 128 at the same time as the 16 bits of red, green and blue, thus this head start for z0 will result in proper timing.

The GO ACC signal 154 is a negative going signal which is applied to the AND gate 153 with the ENADISP signal 131 (indicated in the algorithm as "DISP[-*GO ACCESS(9)]" such that the high ENADISP signal 131 from the sequencer 133 enables the gate 153 to generate the *CONT signal 152 that is negative going and causes the next address input signal 144 to the PROMs 136 through 139 to change to 0040. In response to the 0040 next address signal 144, the PROMs 136 through 139 of the sequencer 133 output the 0040 instruction signals 131 and the 0041 next address signal 144.

Referring to the clock circuit 145 shown in FIG. 11C, in state 0040 by not applying the *INHRGB, *INHZ0 and *INHZ1 signals 167, 166 and 168 respectively to the NAND gates 159, 160 and 161, those gates are effective to output the *CLK1X2XZ0, *CLK1X2XRGB and *CLK1X2Z1 clock signals 130 to the reference holding register 90, to the reference register 92, to the delta holding register 93 and to the delta register 94 of each of the red, green, blue and depth sections 30 through 33. Those clock signals 130 are input to such registers at the same time as the state 0040 *LDRGBZ instruction signal 131 generated by the register 141 of the sequencer 133. At this juncture, the reference holding register 90 and the delta holding register 93 for each red, green, blue and depth sections 30 through 33 have received the 16 bit (and 32 bit for z) signals 37 representing the reference values for red, green, blue, z0, and z1, and the 16 bit (32 for ▲ z) signals 41 representing the delta values for red, green, blue, z0 and z1. In particular, FIG. 14 shows the *CLK1X2XRGB clock signals 130 input to the reference shift registers 92 and delta shift registers 94.

The 0040 state causes the sequencer 133 to generate instruction signals 131 to clear all of the adders 101 through 108, and in banks 109 through 111 (FIG. 16) and the extension shift register 95, the adders 87 and 88 and the register 114 (FIG. 15), so that they are empty and ready for the first pixel group 25—25 to be calculated.

At the end of the 0040 state an 0041 next address signal 141 is applied to the PROM 134 to cause the PROM 134 to cause the register 140 to output an instruction signal 131 that calls the 0041 state. The 0041 state, along with the 0005, 0012, 0050, 0150 and 0060 states, cause the z0 reference signal 44 (FIG. 4) to generate the output signals 122 that represent the 16 LS bit z0 values of the 20 pixels 23—23 of the first group 25—25 of pixels. Since the depth signal 44 is 32 bits deep, this initial operation of the z0 section 120 gives it a head start since it starts processing before any of the red, green, or blue sections 30 through 32 and before the z1 section 121.

In particular, the 0041 state includes the INHIBITRGB and INHIBITZ1 instructions that are output from the PROM 137 (FIG. 11B) to cause the *INHRGB and *INHZ1 instruction signals 131 to cause the inhibit function to occur as to the red, green, blue and z1 sections 30 through 32 and 121. However, the 0041 state does not generate the z0 inhibit signal 131 such that the NAND circuit 159 generates the *CLK1X2XZ0 clock signal 130 to shift the Z0 section 120. In response to such clock signal 130, the reference signal 40 for z0 is shifted from the reference register 92 to the adders 104 through 108. Further, in response to the *CLK1X2XZ0 clock signals 130, the z0 delta signal 41 is shifted from the z0 shift register 94 to the adders 104 through 108 and to the z0 extension register 95.

In response to the *CLK1X2XZ0 clock signal 130 the first adder stage 45 of the z0 section 120 outputs the output signals 47 through 51 and the intermediate signals 53 through 55 for z0. The output signals 53-55 are now also applied to the second stage 46. The z0 section 120 is now conditioned to process the 16 ls bits of z0 through the second adder stage 46.

The next address at the end of the 0041 state is for the 0005 state. In response to the 0005 next address signal 144, the PROM 137 outputs instruction signals 131 so that the register 141 causes the inhibit signals 167 and 168 to be produced as noted above to continue to inhibit the operation of the red, green, blue and z1 sections 31, 32, 33 and 121 respectively. Once again, there is no inhibit signal 166 so that the z0 section 120 is shifted again by the *CLK1X2XZ0 clock signal 130.

The 0005 state also causes the *CLK1X2XZ0 clock signals 130 to be output from the clock circuit 145 to the adder stages 45 and 46 (FIG. 15) to cycle the adders 46 and to write the signals 47-51 into the register 112.

The next address signal 144 of the 0005 state is 0012. START ZOUTREG ENABLES signal 131 is input from the register 143 to the function A counter 179 to reset it to zero. The 0012 state also causes the *CLK1X2XPR timing signal 130 (FIG. 17) to shift the first bit of the signals 121 for z0 into the register 123. The register 115 (FIG. 4) is also loaded with the first LS bit of the R+20ΔR signal 89 and the LS bit of the ΔRz0 signal 41 is applied to the input register 94 in response to the *CLK1X2XZ0 timing signal 130 (FIG. 14)

The next address at the end of the 0012 state is for the 0050 state. In response to the 0050 next address signal 144, the PROM 141 outputs *ENFUNCACNT signals 131 to the function A counter circuit 147. Also, the operation of the red, green, blue and z1 sections 31, 32, 33 and 121 respectively are still inhibited. The ENFUNCACNT signal 131 initiates seven cycles of the function A counter 147. In these seven cycles, z0 section 119 is allowed to cycle because there is no INHIBIT Z0 instruction in state 0050.

The next address at the end of the 0050 state is for the 0150 state. In response to the 0150 next address signal, the PROM 136 outputs next address signals 144 representing the 0150 state to the register 141. The register 141 causes the *INHRGB and *INHZ1 inhibit signals 167 and 168 to inhibit the operation of the red, green, blue and z1 sections 31, 32 and 121 respectively. Also, the z0 first adder stage 45 is shifted one more time to process the 8th LSB. Further, the register 141 generates an *ENFUNCACNT signal 131 which is input to the function A counter 147 again to allow it to count for the eighth time. This ends the 0150 state whereupon the next address 0060 is output.

In response to the 0060 next address signal 144, the PROM 136 causes the register 141 to cause the *INHRGB and *INHZ1 signals 167 and 168 to be applied to the AND circuits 161 and 160 to continue to inhibit the operations of the red, green, blue and z1 sections 31, 32, 33 and 121 respectively. The counter 179 causes the signals 193-196 to generate the SRAS and SCAS signals along with the ENABLE MEMORY READ instruction which enables reading of the z0 signal 121[1] from the z buffer section 128. The ENABLE MEMORY EVEN instruction enables reading of the z0 side of the z buffer section 128. The ENABLE FUNCA COUNTER instruction (the *ENFUNCACNT signal 131) enables the counter 179 to count again for processing another seven cycles. The ENABLE MEMORY ADDR COUNT instruction allows a new address location 190 (FIG. 12) to be selected in the z buffer section 128. Finally, when the register 180 outputs an SDONE signal 131 (see *SHDONE in FIG. 11B) the counter 179 loops for seven cycles. During each of such cycles, the first adder stage 45 for the z0 section 33 processes seven additional LS bits of the z0 signal 40. The register 143 produces a DISP[SDONE(6)] instruction (ENADISP signal 131, FIG. 11B) that dispatches in the same manner as at the end of state 0050. Another function of the ENADISP signal 131 to the sequencer 133 is to control the writing of data to the memory 34 in situations in which the memory 34 can only be written to at certain times. In this case, the fact that the memory 34 can be written to is indicated by the enabling of the ADD gate 153. However, when no *GO ACC input signal 154 is received by the gate 153, the next address signal 144 generated by the register 141 causes the PROM 137 to output the three inhibit signals 166, 167 and 168. As described above with respect to FIG. 11C, the signals 166, 167 and 168 are anded with the *CLKSHADER signal 156 to cause the clock circuit 145 to output the timing signals 130 that inhibit the red, green, blue and depth sections 30 through 33. This is referred to below as the "inhibit function".

When the bit plane memory 34 is ready to be written into, the ENADISP instruction signal 131 is output simultaneously with the *GO ACC signal 154 causing the *CONT signal 152 which changes the next address to the sequencer 133 to 0012, representing the 0012 ACCESS state which causes the PROMs 136 through 139 to output the instruction signals 131 for the 0012 state and its corresponding 0050 next address signal 144. On the other hand, if the bit plane memory 34 is not in condition to be written to, the *GO ACC signal 154 is high when the ENADISP instruction signal 131 is output from the sequencer register 143, such that the output of the AND gate 153 is high which causes the input to the PROMs 136 through 139 to represent the 1012 state. This causes the PROMs 136 through 139 to output the instructions for the 1012 state as indicated in Appendix A, along with the 1012 next address signal 144. The first bit of the 1012 next address signal 144 will stay high (or 1) until the *GO ACC signal 154 goes low indicating that the bit plane memory 34 can be written to. The 1012 state keeps looping until the *GO ACC signal 154 goes low which causes the 0012 next address signal 144 to be input to the PROMs 136 through 139.

The next address signal 144 at the end of state 0060 is for the 0160 state. The register 141 causes *INHRGB and *INHZ1 inhibit signals 167 and 168 to be applied to the AND circuits 161 and 160 to continue to inhibit the operation of the red, green, blue and z1 sections 31, 32, 33 and 121, respectively. The remaining instructions are as described above. The pixel control system 20 is now ready to commence processing the respective red, blue and green input signals 37, 38 and 39 and the z1 input signal 40. At the same time the 16 MS bits of the z0 input signal 40 will be processed, so that at the end of the next 20 cycles there will be a complete z0 output and completed blue, green and red outputs.

Accordingly, in each of the above three situations, the leftmost group 25—25 of pixels 23—23 must be processed, which is completed in states 0051 through 0021. Returning to the process description in terms of FIG. 18 and the program in Appendix A, cycles 0051, 0015 and 0016 are the first three cycles required for allowing the respective red, green and blue sections 30, 31 and 32 to be set up to where the first LSB in each section appears at the output register 123. The z0 section 30 is inhibited in states 0051, 0015 and 0016 because it is ready to process the remaining 16 MS bits through 20 cycles. The z1 section 121 is also cycled through the three setup cycles 0051, 0015 and 0016. These cycles may be understood by referring to the above description.

States 0056 through 0021 may be understood from the above description and result in processing the 16MSB of the z0 output signals 121 and all 16 bits of the red, green and blue output signals 122, 116 and 117 for the twenty pixels 23—23 of the leftmost group 25—25. In states 0020 through 0120, the 8 MS bits of the signals 122, 116 and 117 are loaded into the input registers 124, 125 and 126. The 16 MS bits for z0 output signals 121 are loaded into the input register 192 (FIG. 16).

In state 0021 the compare operation of the comparator 226 (FIG. 6) continues with respect to the z0 signals 121 and 121[1]. This continues into states 0001 and 0002 if there is a center group 25—25 to be processed. Similarly, if the next group is a right group 25—25, this continues into states 0401 and 0403.

If there is one or more center group 25—25, the center section states 0001 through 0006 are processed. These states may be understood based on the above description, noting the branch at states 0002, 0202 and 0402 that depend on how many center groups 25—25 there are.

If the z0 output signal 121 is completely processed when the last center group 25—25 is completely processed, then z0 is to be stored, and state 0402 is next (see "Right Side—Store Z0" heading). State 0402 leads to state 0014, which precedes a final write of data to the memory 34 starting at state 0201.

Otherwise the z1 output signal 121 will be stored starting at state 0401. The processing of the right group 25—25 ends at state 0010 to complete the final write to memory 34 in states 0010 through 0007.

The pixel control apparatus 20 then returns to the idle state 1040 following either of states 0007 or 0017.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

Appendix A
Computer Program Listing
Pixel Control Apparatus and Method © 1989 Auto-trol Technology Corporation Shader - Sequencer Algorithm The Shader Sequencer generates the timing signals needed
to control the Shader hardware when in Shade Mode.
The generator is 1K x 32 bits. The inputs (PROM address) and
the outputs are listed below.

INPUTS (ADDRESS TO PROM)
-------------------------

NEXT ADDRESS 0            (lsb)

```
    NEXT ADDRESS 1
    NEXT ADDRESS 2
    NEXT ADDRESS 3
    NEXT ADDRESS 4
    NEXT ADDRESS 5

SDONE
    WDCNT-1
    WDCNT=0
    *GO_ACCESS           (msb)
---------------------------------

OUTPUTS
---------------------------------
    NEXT ADDRESS 0       (lsb)
    NEXT ADDRESS 1
    NEXT ADDRESS 2
    NEXT ADDRESS 3
    NEXT ADDRESS 4
    NEXT ADDRESS 5
    *SHDDONE
    *ENWDCNT

*INHRGB
    *INHZ0
    *INHZ1
    *ENFUNCACNT
    LDRGBZREGS
    CLRRGB
    *CLRZ0
    *CLRZ1
    *Z0TOZIN
    ZEVEN
    MEVEN
    WRITE
    READ
    *LDWRTREG
    FREGSEL0
    FREGSEL1

*CLRZCOMP
    *STARTZOUTEN
    *SHIFTZOUTEN
    *ENWDDISP
    *ENDDISP
    *ENMCNT
    LDZINREG
    ENADISP              (msb)
---------------------------------

SHADER DOIT COMMANDS :

CLEAR RGB                    - Clears Red, Green and Blue Extension
                               Shift registers and Adders.
CLEAR Z COMPARE ADDERS       - Clears the Z compare Adders.
CLEAR Z0                     - Clears Z0 Extension Shift registers and
                               Adders.
```

| | |
|---|---|
| CLEAR Z1 | - Clears Z1 Extension Shift registers and Adders. |
| DEC WORD COUNTER | - Decrement the 20 pixel word counter (The number of complete 20 pixel groups in the scan line being shaded) and Increments the TExture RAM Address. |
| DISP [SDONE(6)] | - Enables Dispatching when the Function A Counter is almost finished. |
| DISP [*GO_ACCESS(9)] | - Enables Dispatching when a *GO_ACCESS Signal is true. |
| ENABLE DISP [WDCNT=0(8), WDCNT-1(7)] | - Enables Dispatching in the next state when the 20 pixel Word Count is zero or the special case when the Left and Right side of the polygon scan line are in the same 20 pixel group. |
| ENABLE FUNCA COUNTER | - Enables the Function A counter to count. (This counter selects the proper registers for loading and reading). |
| ENABLE MEMORY ADDR COUNT | - Enables the Memory Address Counter to count. |
| ENABLE MEMORY EVEN | - Enables Reading or Writing of the EVEN side of the Memory. |
| ENABLE MEMORY ODD | - Enables Reading or Writing of the EVEN side of the Memory. |
| ENABLE MEMORY READ | - Enables Reading of the Memory. |
| ENABLE MEMORY WRITE | - Enables Writing to the Memory. |
| FUBSSRC = CENTER | - Enables the Center Fill Register to the Fill Masking PAL. |
| FUBSSRC = LEFT | - Enables the Left Fill Register to the Fill Masking PAL. |
| FUBSSRC = RIGHT | - Enables the Right Fill Register to the Fill Masking PAL. |
| INHIBIT RGB | - Inhibits the clocks to the Red, Green, and Blue Adders and Shift Registers. (Registered) |
| INHIBIT Z0 | - Inhibits the clocks to the Z0 Adders and Shift Registers. (Registered) |
| INHIBIT Z1 | - Inhibits the clocks to the Z1 Adders and Shift Registers. (Registered) |
| LOAD RGBZ | - Transfers data from the Red, Green and Blue Holding registers to their Shift registers. |
| ODD TO ZOUTBUS | - Enables the ODD half of the ZOUTREGS to the ZOUTBUS. |
| SHADER DONE | - Turns off the GO signal so the shader clock is switched back to 1X mode. |
| SHIFT ZOUTREG ENABLES | - Shifts the ZOUTREG Enable register so the next ZOUTREG is selected to drive the ZOUTBUS. |
| START ZOUTREG ENABLES | - Starts the shift register to enable one at a time the ZOUTREG rgisters to the ZOUTBUS. |
| Z0 TO ZINBUS | - Selects Z0 Output register to the ZINBUS. |
| ZBUS TO/FROM EVEN | - Enables the ZINBUS to the EVEN half of the ZINREGs and enables the EVEN half of the ZOUTREGS to the ZOUTBUS. |

ZBUS TO/FROM ODD — Enables the ZINBUS to the EVEN half of the ZINREGs and enables the ODD half of the ZOUTREGS to the ZOUTBUS.

Fill all unused States with the following state
  27730344240 oct.

Default condition
  07710347700 oct.

|  |  | Default | Unused States |  |
|---|---|---|---|---|
| NEXT ADDRESS 0 | (lsb) | 0 | 0 |  |
| NEXT ADDRESS 1 |  | 0 | 0 |  |
| NEXT ADDRESS 2 |  | 0 | 0 |  |
| NEXT ADDRESS 3 |  | 0 | 0 | A0 |
| NEXT ADDRESS 4 |  | 0 | 0 |  |
| NEXT ADDRESS 5 |  | 0 | 1 |  |
| *SHDDONE |  | 1 | 0 |  |
| *ENWDCNT |  | 1 | 1 |  |
|  |  |  |  |  |
| *INHRGB |  | 1 | 0 |  |
| *INHZ0 |  | 1 | 0 |  |
| *INHZ1 |  | 1 | 0 |  |
| *ENFUNCACNT |  | 1 | 1 | C8 |
| LDRGBZREGS |  | 0 | 0 |  |
| CLRRGB |  | 0 | 0 |  |
| *CLRZ0 |  | 1 | 1 |  |
| *CLRZ1 |  | 1 | 1 |  |
|  |  |  |  |  |
| *Z0TOZIN |  | 0 | 0 |  |
| ZEVEN |  | 0 | 0 |  |
| MEVEN |  | 0 | 0 |  |
| WRITE |  | 0 | 0 | 60 |
| READ |  | 0 | 0 |  |
| *LDWRTREG |  | 1 | 1 |  |
| FREGSEL0 |  | 0 | 1 |  |
| FREGSEL1 |  | 0 | 0 |  |
|  |  |  |  |  |
| *CLRZCOMP |  | 1 | 1 |  |
| *STARTZOUTEN |  | 1 | 1 |  |
| *SHIFTZOUTEN |  | 1 | 1 |  |
| *ENWDDISP |  | 1 | 1 | BF |
| *ENDDISP |  | 1 | 1 |  |
| *ENMCNT |  | 1 | 1 |  |
| LDZINREG |  | 0 | 0 |  |
| ENADISP | (msb) | 0 | 1 |  |

Note: NEXT ADDRESS 5 is used to force an ACCESS so the Idle state 1040 will Dispatch on GO ONLY and not on ACCESS AND GO. Therefore any state dispatching on ACCESS must NOT contain NXTADR5 = 1 in previous state of this state.

Start of Algorithm

```
********************************************************************
************************* Start ************************************
********************************************************************

*** Idle State ***

.- 1040
|---------------------
| INHIBIT RGB
| INHIBIT Z0
| INHIBIT Z1
| DISP [*GO_ACCESS(9)]
|---------------------
.+ 1040 ; No *GO (ACCESS is forced by NXTADR5 = 1)
;  0040 ; *GO

*** *GO ***
   .- 0040
   |---------------------
   | LOAD RGBZ              ; Transfer Hold Regs to RGBZ
   |                        ;    shift regs.
   | CLEAR RGB
   | CLEAR Z0
   | CLEAR Z1
   |---------------------
   .+ 0041

*** Setup Z0 ***
   .- 0041
   |---------------------
   |                        ; Delta Setup for Z0 and
   |                        ;   Z0 1st level of addition
   | INHIBIT RGB            ; Shift only Z0
   | INHIBIT Z1
   |---------------------
   .+ 0005

.- 0005
   |---------------------
   |                        ; Z0 2nd level of addition
   | INHIBIT RGB            ; Shift only Z0
   | INHIBIT Z1
   | DISP [*GO_ACCESS(9)]
   |---------------------
   .+ 1012 ; no access
   ;  0012 ; access .- 1012 ; no access
           |----------------
           | INHIBIT RGB        ; Inhibit everything
           | INHIBIT Z0
           | INHIBIT Z1
           | DISP [*GO_ACCESS(9)]
           |----------------
           .+ 1012 ; no access
;             0012 ; access
```

```
.- 0012 ; access
|----------------------
|                              ; Load Adder Output Registers
| INHIBIT RGB                  ; Shift only Z0
| INHIBIT Z1
| START ZOUTREG ENABLES        ; Clear FUNCA Counter & Load ZOUTREG
|                              ;   Enable Shift Register
|----------------------
.+ 0050

.- 0050 ; not sdone
|----------------------
| INHIBIT RGB                  ; Shift only Z0
| INHIBIT Z1
| ENABLE FUNCA COUNTER
| DISP [SDONE(6)]              ; Loop in this state
|                              ;   for 7 cycles
|----------------------
.+ 0150 ; sdone
;  0050 ; not sdone .- 0150 ; sdone
|----------------------
| INHIBIT RGB                  ; Shift only Z0
| INHIBIT Z1
| ENABLE FUNCA COUNTER
|----------------------
.+ 0060

.- 0060 ; not sdone
|----------------------
| INHIBIT RGB                  ; Shift only Z0
| INHIBIT Z1
| ENABLE MEMORY READ           ; Read first 20 pixel Z
| ENABLE MEMORY EVEN
| ENABLE FUNCA COUNTER
| ENABLE MEMORY ADDR COUNT     ; Enable Address to DECREMENT by one
| DISP [SDONE(6)]              ; Loop in this state
|                              ;   for 7 cycles
|----------------------
.+ 0060 ; not sdone
;  0160 ; sdone .- 0160 ; sdone
|----------------------
| INHIBIT RGB                  ; Shift only Z0
| INHIBIT Z1
| ENABLE MEMORY READ
| ENABLE MEMORY EVEN
| ENABLE FUNCA COUNTER
| ENABLE MEMORY ADDR COUNT
|----------------------
.+ 0051

****************************************************************
************************ Left Side  *****************************
****************************************************************

*** Setup RGB and Store RGB, Store Z0 and Setup Z1 ***
```

.- 0051
```
|----------------------
| ENABLE MEMORY READ    ; To allow Read Operation to complete from
| ENABLE MEMORY EVEN    ;    previous SFUNCA sequence
| INHIBIT Z0            ; RGB and Z1 Delta setup and
|                       ;    1st level of addition
|----------------------
```
.+ 0015

.- 0015
```
|----------------------
| ENABLE MEMORY READ    ; To allow Read Operation to complete from
| ENABLE MEMORY EVEN    ;    previous SFUNCA sequence
| INHIBIT Z0            ; RGB and Z1 2nd level of addition
| DISP [*GO_ACCESS(9)]
|----------------------
```
.+ 1016 ; no access
;   0016 ; access

```
        .- 1016 ; no access
        |----------------
        | INHIBIT RGB         ; Inhibit everything
        | INHIBIT Z0
        | INHIBIT Z1
        | DISP [*GO_ACCESS(9)]
        |----------------
        .+ 1016 ; no access
            0016 ; access
```

.- 0016
```
|----------------------
| INHIBIT Z0
| START ZOUTREG ENABLES ; Clear FUNCA Counter & Load ZOUTREG
|                       ;    Enable Shift Register
| SHIFT ZOUTREG ENABLES ; Enables Loading of ZOUTREG EN SHIFT REG
| ZBUS TO/FROM EVEN     ; Starts one state early because it's Registered
| CLEAR Z COMPARE ADDERS
|----------------------
```
.+ 0056

.- 0056 ; not sdone
```
|----------------------
| LOAD ZINREG
| Z0 TO ZINBUS
| ZBUS TO/FROM EVEN
| ENABLE FUNCA COUNTER
| SHIFT ZOUTREG ENABLES
| ENABLE MEMORY ADDR COUNT  ; Enable Address to INCREMENT by 2
| DISP [SDONE(6)]       ; Loop in this state
|                       ;    for 7 cycles
|----------------------
```
.+ 0056 ; not sdone
;   0156 ; sdone .- 0156 ; sdone
```
|----------------------
| LOAD ZINREG
| Z0 TO ZINBUS
```

```
| ZBUS TO/FROM EVEN
| ENABLE FUNCA COUNTER
| SHIFT ZOUTREG ENABLES
| ENABLE MEMORY ADDR COUNT
|----------------------
.+ 0020

.- 0020 ; not sdone
|----------------------
| LOAD ZINREG
| Z0 TO ZINBUS
| ZBUS TO/FROM EVEN
| ENABLE MEMORY READ      ; Read 2nd Z
| ENABLE MEMORY ODD
| ENABLE FUNCA COUNTER
| SHIFT ZOUTREG ENABLES
| ENABLE MEMORY ADDR COUNT  ; Enable Address to DECREMENT by 1
| DISP [SDONE(6)]        ; Loop in this state
|                        ;    for 7 cycles
|----------------------
.+ 0020 ; not sdone
;  0120 ; sdone .- 0120 ; sdone
|----------------------
| LOAD ZINREG
| Z0 TO ZINBUS
| ZBUS TO/FROM EVEN
| ENABLE MEMORY READ
| ENABLE MEMORY ODD
| ENABLE FUNCA COUNTER
| SHIFT ZOUTREG ENABLES
| ENABLE MEMORY ADDR COUNT
| ENABLE DISP [WDCNT=0(8), WDCNT-1(7)]
|                        ; Enable DISP in next state
|                        ; If 1 20 pixel group then
|                        ;    goto FINAL WRITE TO
|                        ;    Z BUFFER - EVEN Z
|                        ; If Left side and Right
|                        ;    are consecutive
|                        ;    20 pixel groups then
|                        ;    goto RIGHT SIDE - STORE Z1
|----------------------
.+ 0021

.- 0021
|----------------------
| ENABLE MEMORY READ     ; To allow Read Operation to complete from
| ENABLE MEMORY ODD      ;    previous SFUNCA sequence
| INHIBIT RGB
| INHIBIT Z0
| INHIBIT Z1
| CLEAR RGB
| CLEAR Z0
| FBUSSRC = LEFT         ; Left side Fill bits
| LOAD WRT REG           ; Load Correct Write Enables
| DEC WORD COUNTER
|                        ; DISP [WDCNT=0(8), WDCNT-1(7)]
|----------------------
.+ 0001 ; more than two 20 pixel groups
```

```
;    0201 ; one 20 pixel group
;    0401 ; two consecutive 20 pixel groups
;    0601 ; not valid

******************************************************************
********************** Center Section  ***************************
******************************************************************

*** Setup RGB and Store RGB, Store Z1 and Setup Z0 ***
*** More than two 20 pixel groups (Word Count >= 1) ***

.- 0001
|-----------------------
| ENABLE MEMORY READ     ; To allow Read Operation to complete from
| ENABLE MEMORY ODD      ;   previous SFUNCA sequence
| INHIBIT Z1             ; RGB and Z0 Delta setup and 1st level
|                        ;   of addition
|-----------------------
.+ 0022

.- 0003
   |-----------------------
   | ENABLE MEMORY READ     ; To allow Read Operation to complete from
   | ENABLE MEMORY ODD      ;   previous SFUNCA sequence
   | INHIBIT Z1             ; RGB and Z0 Delta setup and 1st level
   |                        ;   of addition
   |-----------------------
   .+ 0022

.- 0022
|-----------------------
| INHIBIT Z1             ; RGB and Z0 2nd level of addition
| DISP [*GO_ACCESS(9)]
|-----------------------
.+ 1023 ; no access
;  0023 ; access .- 1023 ; no access
        |----------------
        | INHIBIT RGB       ; Inhibit everything
        | INHIBIT Z0
        | INHIBIT Z1
        | DISP [*GO_ACCESS(9)]
        |----------------
        .+ 1023 ; no access
    ;     0023 ; access .- 0023 ; access
|-----------------------
| INHIBIT Z1
| START ZOUTREG ENABLES ; Clear FUNCA Counter & Load ZOUTREG
|                       ;    Enable Shift Register
| SHIFT ZOUTREG ENABLES ; Enables Loading of ZOUTREG EN SHIFT REG
| ZBUS TO/FROM ODD      ; Starts one state early because it's Registered
| CLEAR Z COMPARE ADDERS
|-----------------------
.+ 0024
```

```
.- 0024 ; not sdone
|----------------------
| LOAD ZINREG
| Z1 TO ZINBUS
| ZBUS TO/FROM ODD
| ENABLE MEMORY WRITE
| ENABLE MEMORY EVEN
| ENABLE FUNCA COUNTER
| SHIFT ZOUTREG ENABLES
| ENABLE MEMORY ADDR COUNT
| DISP [SDONE(6)]        ; Loop in this state
|                        ;    for 7 cycles
|----------------------
.+ 0024 ; not sdone
;   0124 ; sdone
.- 0124 ; sdone
|----------------------
| LOAD ZINREG
| Z1 TO ZINBUS
| ZBUS TO/FROM ODD
| ENABLE MEMORY WRITE
| ENABLE MEMORY EVEN
| ENABLE FUNCA COUNTER
| SHIFT ZOUTREG ENABLES
| ENABLE MEMORY ADDR COUNT
|----------------------
.+ 0025

.- 0025 ; not sdone
|----------------------
| LOAD ZINREG
| Z1 TO ZINBUS
| ZBUS TO/FROM ODD
| ENABLE MEMORY READ
| ENABLE MEMORY EVEN
| ENABLE FUNCA COUNTER
| SHIFT ZOUTREG ENABLES
| ENABLE MEMORY ADDR COUNT
| DISP [SDONE(6)]        ; Loop in this state
|                        ;    for 7 cycles
|----------------------
.+ 0025 ; not sdone
;   0125 ; sdone
.- 0125 ; sdone
|----------------------
| LOAD ZINREG
| Z1 TO ZINBUS
| ZBUS TO/FROM ODD
| ENABLE MEMORY READ
| ENABLE MEMORY EVEN
| ENABLE FUNCA COUNTER
| SHIFT ZOUTREG ENABLES
| ENABLE MEMORY ADDR COUNT
| ENABLE DISP [WDCNT=0(8), WDCNT-1(7)]
|                        ; Enable DISP in next state
|                        ; Dispatch to
|                        ;    RIGHT SIDE - STORE Z0
|----------------------
.+ 0026
```

```
.- 0026
|----------------------
| ENABLE MEMORY READ    ; To allow Read Operation to complete from
| ENABLE MEMORY EVEN    ;   previous SFUNCA sequence
| INHIBIT RGB
| INHIBIT Z0
| INHIBIT Z1
| CLEAR RGB
| CLEAR Z1
| FBUSSRC = CENTER
| LOAD WRT REG          ; Correct Write Enables
| DEC WORD COUNTER
|                       ; DISP [WDCNT=0(8), WDCNT-1(7)]
|----------------------
.+ 0002 ; More Center groups left
;  0202 ; not valid
;  0402 ; Only Right side left to do
;  0602 ; not valid

*** Setup RGB and Store RGB, Store Z0 and Setup Z1 ***

.- 0002
|----------------------
| ENABLE MEMORY READ    ; To allow Read Operation to complete from
| ENABLE MEMORY EVEN    ;   previous SFUNCA sequence
| INHIBIT Z0            ; RGB and Z1 Delta setup and 1st level
|                       ;   of addition
|----------------------
.+ 0027

.- 0027
|----------------------
| INHIBIT Z0            ; RGB and Z1 2nd level of addition
| DISP [*GO_ACCESS(9)]
|----------------------
.+ 1030 ; no access
;  0030 ; access .- 1030 ; no access
       |----------------
       | INHIBIT RGB        ; Inhibit everything
       | INHIBIT Z0
       | INHIBIT Z1
       | DISP [*GO_ACCESS(9)]
       |----------------
       .+ 1030 ; no access
;         0030 ; access .- 0030 ; access
|----------------------
| INHIBIT Z0
| START ZOUTREG ENABLES ; Clear FUNCA Counter & Load ZOUTREG
|                       ;   Enable Shift Register
| SHIFT ZOUTREG ENABLES ; Enables Loading of ZOUTREG EN SHIFT REG
| ZBUS TO/FROM EVEN     ; Starts one state early because it's Registered
| CLEAR Z COMPARE ADDERS
|----------------------
.+ 0031
```

```
.- 0031 ; not sdone
|----------------------
| LOAD ZINREG
| Z0 TO ZINBUS
| ZBUS TO/FROM EVEN
| ENABLE MEMORY WRITE
| ENABLE MEMORY ODD
| ENABLE FUNCA COUNTER
| SHIFT ZOUTREG ENABLES
| ENABLE MEMORY ADDR COUNT
| DISP [SDONE(6)]      ; Loop in this state
|                      ;   for 7 cycles
|----------------------
.+ 0031 ; not sdone
;   0131 ; sdone .- 0131 ; sdone
|----------------------
| LOAD ZINREG
| Z0 TO ZINBUS
| ZBUS TO/FROM EVEN
| ENABLE MEMORY WRITE
| ENABLE MEMORY ODD
| ENABLE FUNCA COUNTER
| SHIFT ZOUTREG ENABLES
| ENABLE MEMORY ADDR COUNT
|----------------------
.+ 0032
.- 0032 ; not sdone
|----------------------
| LOAD ZINREG
| Z0 TO ZINBUS
| ZBUS TO/FROM EVEN
| ENABLE MEMORY READ
| ENABLE MEMORY ODD
| ENABLE FUNCA COUNTER
| SHIFT ZOUTREG ENABLES
| ENABLE MEMORY ADDR COUNT
| DISP [SDONE(6)]      ; Loop in this state
|                      ;   for 7 cycles
|----------------------
.+ 0032 ; not sdone
;   0132 ; sdone .- 0132 ; sdone
|----------------------
| LOAD ZINREG
| Z0 TO ZINBUS
| ZBUS TO/FROM EVEN
| ENABLE MEMORY READ
| ENABLE MEMORY ODD
| ENABLE FUNCA COUNTER
| SHIFT ZOUTREG ENABLES
| ENABLE MEMORY ADDR COUNT
| ENABLE DISP [WDCNT=0(8), WDCNT-1(7)]
|                      ; Enable DISP in next state
|                      ; Dispatch to
|                      ;   RIGHT SIDE - STORE Z1
|----------------------
.+ 0033
```

```
.- 0033
|----------------------
| ENABLE MEMORY READ     ; To allow Read Operation to complete from
| ENABLE MEMORY ODD      ;   previous SFUNCA sequence
| INHIBIT RGB
| INHIBIT Z0
| INHIBIT Z1
| CLEAR RGB
| CLEAR Z0
| FBUSSRC = CENTER
| LOAD WRT REG           ; Correct Write Enables
| DEC WORD COUNTER
|                        ; DISP [WDCNT=0(8), WDCNT-1(7)]
|----------------------
.+ 0003 ; More Center Groups left
;  0203 ; not valid
;  0403 ; Only Right side left to do
;  0603 ; not valid

*********************************************************
******************* Right Side - Store Z1 *******************
*********************************************************

*** Setup RGB and Store RGB, Store Z1 ***

.- 0401
|----------------------
| ENABLE MEMORY READ     ; To allow Read Operation to complete from
| ENABLE MEMORY ODD      ;   previous SFUNCA sequence
| INHIBIT Z1             ; RGB and Z1 Delta setup and 1st level
|                        ;   of addition
|----------------------
.+ 0034

.- 0403
     |----------------------
     | ENABLE MEMORY READ     ; To allow Read Operation to complete from
     | ENABLE MEMORY ODD      ;   previous SFUNCA sequence
     | INHIBIT Z1             ; RGB and Z1 Delta setup and 1st level
     |                        ;   of addition
     |----------------------
     .+ 0034
.- 0034
|----------------------
| INHIBIT Z1
| DISP [*GO_ACCESS(9)]
|----------------------
.+ 1035 ; no access
;  0035 ; access .- 1035 ; no access
          |----------------
          | INHIBIT RGB         ; Inhibit everything
          | INHIBIT Z0
          | INHIBIT Z1
          | DISP [*GO_ACCESS(9)]
          |----------------
          .+ 1035 ; no access
;             0035 ; access
```

```
.- 0035
|----------------------
| INHIBIT Z1
| START ZOUTREG ENABLES  ; Clear FUNCA Counter & Load ZOUTREG
|                        ;    Enable Shift Register
| SHIFT ZOUTREG ENABLES  ; Enables Loading of ZOUTREG EN SHIFT REG
| ZBUS TO/FROM ODD       ; Starts one state early because it's Registered
| CLEAR Z COMPARE ADDERS
|----------------------
.+ 0036

.- 0036 ; not sdone
|----------------------
| LOAD ZINREG
| Z1 TO ZINBUS
| ZBUS TO/FROM ODD
| ENABLE MEMORY WRITE
| ENABLE MEMORY EVEN
| ENABLE FUNCA COUNTER
| SHIFT ZOUTREG. ENABLES
| ENABLE MEMORY ADDR COUNT
| DISP [SDONE(6)]        ; Loop in this state
|                        ;    for 7 cycles
|----------------------
.+ 0036 ; not sdone
;    0136 ; sdone .- 0136 ; sdone
|----------------------
| LOAD ZINREG
| Z1 TO ZINBUS
| ZBUS TO/FROM ODD
| ENABLE MEMORY WRITE
| ENABLE MEMORY EVEN
| ENABLE FUNCA COUNTER
| SHIFT ZOUTREG ENABLES
| ENABLE MEMORY ADDR COUNT
|----------------------
.+ 0037

.- 0037 ; not sdone
|----------------------
| LOAD ZINREG
| Z1 TO ZINBUS
| ZBUS TO/FROM ODD
| ENABLE MEMORY READ
| ENABLE MEMORY EVEN
| ENABLE FUNCA COUNTER
| SHIFT ZOUTREG ENABLES
| ENABLE MEMORY ADDR COUNT
| DISP [SDONE(6)]        ; Loop in this state
|                        ;    for 7 cycles
|----------------------
.+ 0037 ; not sdone
;    0137 ; sdone
```

.- 0137 ; sdone
|----------------------
| LOAD ZINREG
| Z1 TO ZINBUS
| ZBUS TO/FROM ODD
| ENABLE MEMORY READ
| ENABLE MEMORY EVEN
| ENABLE FUNCA COUNTER
| SHIFT ZOUTREG ENABLES
| ENABLE MEMORY ADDR COUNT
|----------------------
.+ 0004

.- 0004
|----------------------
| ENABLE MEMORY READ    ; To allow Read Operation to complete from
| ENABLE MEMORY EVEN    ;   previous SFUNCA sequence
| INHIBIT RGB
| INHIBIT Z0
| INHIBIT Z1
| FBUSSRC = RIGHT
| LOAD WRT REG          ; Correct Write Enables
|----------------------
.+ 0006

.- 0006
|----------------------
| ENABLE MEMORY READ    ; To allow Read Operation to complete from
| ENABLE MEMORY EVEN    ;   previous SFUNCA sequence
| INHIBIT RGB
| INHIBIT Z0
| INHIBIT Z1
| DISP [*GO_ACCESS(9)]
|----------------------
.+ 1010 ; no access
;   0010 ; access

************************************************************
*************** Final Write to Z Buffer - Odd Z  ***************
************************************************************

.- 1010 ; no access
            |----------------
            | INHIBIT RGB       ; Inhibit everything
            | INHIBIT Z0
            | INHIBIT Z1
            | DISP [*GO_ACCESS(9)]
            |----------------
        .+ 1010 ; no access
;           0010 ; access .- 0010 ; access, not sdone
|----------------------
| ENABLE MEMORY WRITE
| ENABLE MEMORY ODD
| ENABLE FUNCA COUNTER
| ENABLE MEMORY ADDR COUNT
| DISP [SDONE(6)]       ; Loop in this state
|                       ;   for 7 cycles
|----------------------
.+ 0010 ; not sdone
;   0110 ; sdone

```
.- 0110 ; sdone
|----------------------
| ENABLE MEMORY WRITE
| ENABLE MEMORY ODD
| ENABLE FUNCA COUNTER
| ENABLE MEMORY ADDR COUNT
| SHADER DONE          ; Turns off GO signal
|----------------------
.+ 0042

.- 0042
|----------------------
| INHIBIT RGB          ; Inhibit Everything
| INHIBIT Z0
| INHIBIT Z1
| SHADER DONE          ; Turns off GO signal
|----------------------
.+ 0055

.- 0055
|----------------------  ; State 0042 Duplicated because of clock skew
|                        ;   when running at 50 nsec clock.
| INHIBIT RGB            ; Inhibit Everything
| INHIBIT Z0
| INHIBIT Z1
| SHADER DONE            ; Turns off GO signal
|----------------------
.+ 0007

.- 0007
|----------------------
| INHIBIT RGB          ; Inhibit Everything
| INHIBIT Z0
| INHIBIT Z1
| SHADER DONE          ; Turns off GO signal
| DISP [*GO_ACCESS(9)]
|                      ; Return to Idle state
|----------------------
.+ 1040

*********************************************************************
********************* Right Side - Store Z0 *************************
*********************************************************************
*** Setup RGB and Store RGB, Store Z0 ***

.- 0402
|----------------------
| ENABLE MEMORY READ   ; To allow Read Operation to complete from
| ENABLE MEMORY EVEN   ;    previous SFUNCA sequence
| INHIBIT Z0           ; RGB and Z0 Delta setup and 1st level
|                      ;    of addition
|----------------------
.+ 0000

.- 0000
|----------------------
| INHIBIT Z0
| DISP [*GO_ACCESS(9)]
|----------------------
.+ 1011 ; access
;  0011 ; no access
```

```
        .- 1011 ; no access
        |------------------
        | INHIBIT RGB        ; Inhibit everything
        | INHIBIT Z0
        | INHIBIT Z1
        | DISP [*GO_ACCESS(9)]
        |------------------
        .+ 1011 ; no access
;           0011 ; access .- 0011 ; access
|----------------------
| INHIBIT Z0
| START ZOUTREG ENABLES ; Clear FUNCA Counter & Load ZOUTREG
|                       ;   Enable Shift Register
| SHIFT ZOUTREG ENABLES ; Enables Loading of ZOUTREG EN SHIFT REG
| ZBUS TO/FROM EVEN     ; Starts one state early because it's Registered
| CLEAR Z COMPARE ADDERS
|----------------------
.+ 0045

.- 0045 ; not sdone
|----------------------
| LOAD ZINREG
| Z0 TO ZINBUS
| ZBUS TO/FROM EVEN
| ENABLE MEMORY WRITE
| ENABLE MEMORY ODD
| ENABLE FUNCA COUNTER
| SHIFT ZOUTREG ENABLES
| ENABLE MEMORY ADDR COUNT
| DISP [SDONE(6)]       ; Loop in this state
|                       ;   for 7 cycles
|----------------------
.+ 0045 ; not sdone
;   0145 ; sdone .- 0145 ; sdone
|----------------------
| LOAD ZINREG
| Z0 TO ZINBUS
| ZBUS TO/FROM EVEN
| ENABLE MEMORY WRITE
| ENABLE MEMORY ODD
| ENABLE FUNCA COUNTER
| SHIFT ZOUTREG ENABLES
| ENABLE MEMORY ADDR COUNT
|----------------------
.+ 0046
```

```
.- 0046 ; not sdone
|--------------------
| LOAD ZINREG
| Z0 TO ZINBUS
| ZBUS TO/FROM EVEN
| ENABLE MEMORY READ
| ENABLE MEMORY ODD
| ENABLE FUNCA COUNTER
| SHIFT ZOUTREG ENABLES
| ENABLE MEMORY ADDR COUNT
| DISP [SDONE(6)]         ; Loop in this state
|                         ;   for 7 cycles
|--------------------
.+ 0046 ; not sdone
;  0146 ; sdone .- 0146 ; sdone
|--------------------
| LOAD ZINREG
| Z0 TO ZINBUS
| ZBUS TO/FROM EVEN
| ENABLE MEMORY READ
| ENABLE MEMORY ODD
| ENABLE FUNCA COUNTER
| SHIFT ZOUTREG ENABLES
| ENABLE MEMORY ADDR COUNT
|--------------------
.+ 0047

.- 0047
|--------------------
| ENABLE MEMORY READ      ; To allow Read Operation to complete from
| ENABLE MEMORY ODD       ;   previous SFUNCA sequence
| INHIBIT RGB
| INHIBIT Z0
| INHIBIT Z1
| FBUSSRC = RIGHT
| LOAD WRT REG            ; Correct Write Enables
|--------------------
.+ 0014

.- 0014
|--------------------
| ENABLE MEMORY READ      ; To allow Read Operation to complete from
| ENABLE MEMORY ODD       ;   previous SFUNCA sequence
| INHIBIT RGB
| INHIBIT Z0
| INHIBIT Z1
| DISP [*GO_ACCESS(9)]
|--------------------
.+ 1013 ; no access
;  0013 ; access
```

```
******************************************************************
******************* Final Write to Z Buffer - Even Z *******************
******************************************************************

.- 0201
  |----------------
  | ENABLE MEMORY READ    ; To allow Read Operation to complete from
  | ENABLE MEMORY ODD     ;    previous SFUNCA sequence
  | INHIBIT RGB           ; Inhibit everything
  | INHIBIT Z0
  | INHIBIT Z1
  | DISP [*GO_ACCESS(9)]
  |----------------
  .+ 1013 ; no access
;    0013 ; access .- 1013 ; no access
          |----------------
          | INHIBIT RGB         ; Inhibit everything
          | INHIBIT Z0
          | INHIBIT Z1
          | DISP [*GO_ACCESS(9)]
          |----------------
          .+ 1013 ; no access
;            0013 ; access .- 0013 ; access, not sdone
  |----------------------
  | ENABLE MEMORY WRITE
  | ENABLE MEMORY EVEN
  | ENABLE FUNCA COUNTER
  | ENABLE MEMORY ADDR COUNT
  | DISP [SDONE(6)]       ; Loop in this state
  |                       ;    for 7 cycles
  |----------------------
  .+ 0013 ; not sdone
;    0113 ; sdone .- 0113 ; sdone
  |----------------------
  | ENABLE MEMORY WRITE
  | ENABLE MEMORY EVEN
  | ENABLE FUNCA COUNTER
  | ENABLE MEMORY ADDR COUNT
  | SHADER DONE           ; Turns off GO signal
  |----------------------
  .+ 0053

.- 0053
  |----------------------
  | INHIBIT RGB           ; Inhibit Everything
  | INHIBIT Z0
  | INHIBIT Z1
  | SHADER DONE           ; Turns off GO signal
  |----------------------
  .+ 0054
```

```
.- 0054
|----------------------- ; State 0053 Duplicated because of clock skew
| INHIBIT RGB            ; Inhibit Everything
| INHIBIT Z0
| INHIBIT Z1
| SHADER DONE            ; Turns off GO signal
|-----------------------
.+ 0017

.- 0017
|-----------------------
| INHIBIT RGB            ; Inhibit Everything
| INHIBIT Z0
|.INHIBIT Z1
| SHADER DONE            ; Turns off GO signal
| DISP [*GO_ACCESS(9)]
|                        ; Return to Idle state
|-----------------------
.+ 1040

*** Invalid states ***

.- 0202
|-----------------------
| INHIBIT RGB            ; Should never reach this state
| INHIBIT Z0
| INHIBIT Z1
|-----------------------
.+ 0202

.- 0601
|-----------------------
| INHIBIT RGB            ; Should never reach this state
| INHIBIT Z0
| INHIBIT Z1
|-----------------------
.+ 0601

.- 0602
|-----------------------
| INHIBIT RGB            ; Should never reach this state
| INHIBIT Z0
| INHIBIT Z1
|-----------------------
.+ 0602

.- 0603
|-----------------------
| INHIBIT RGB            ; Should never reach this state
| INHIBIT Z0
| INHIBIT Z1
|-----------------------
.+ 0603
```

End of Shader Algorithm

```
***************************************************************
********************** FUNCA COUNTER **************************
***************************************************************
```

FUNCA COUNTER
   (setup RGB, Calculate RGB, Setup one Z, Calculate the other Z)

```
    Bits   3   2   1   0
           ----------------
           0   0   0   0
           0   0   0   1
           0   0   1   0
           0   0   1   1
           0   1   0   0
           0   1   0   1
           0   1   1   0
           0   1   1   1
           1   0   0   0
           1   0   0   1
           1   0   1   0
           1   0   1   1
           1   1   0   0
           1   1   0   1
           1   1   1   0
           1   1   1   1

^   ^   ^   ^
           !   !   !   !
           !   !   !   !--- !
           !   !   !------   >  FUNCA(2-0) & REGSEL(2-0)
           !   !------------!
           !   !
           !   !------------    Select MS if READ or WRITE
           !
           !-----------------   READ
                               LDINREG (RGB)
                               Select MS for ZINREG

SLDBPMADR

!----------------------------
  ! FUNCA(2-0) = REGSEL(2-0) = 0, (Reset Condition)
  ! ENABLE MEMORY WRITE
  ! SLDBPMADR
  ! ZRAS
  !
  ! BPMRAS (FAST MODE)
  !
  ! BPMRAS (SLOW MODE)
  ! BPMWRITE (SLOW MODE)
  !----------------------------
```

```
!-----------------------------
! FUNCA(2-0) = REGSEL(2-0) = 1
! ENABLE MEMORY WRITE
! ZRAS
!
! BPMRAS (FAST MODE)
! BPMWRITE (FAST MODE)
!
! BPMRAS (SLOW MODE)
! BPMCAS (SLOW MODE)
! BPMWRITE (SLOW MODE)
!-----------------------------

!-----------------------------
! FUNCA(2-0) = REGSEL(2-0) = 2
! ENABLE MEMORY WRITE
! ZRAS
! ZCAS
! ZWRT
! ENLS
! ENABLE MEMORY ADDRESS COUNT    ; Count addr up by 1
! MEMORY ADDRESS COUNT UP
!
! BPMRAS (FAST MODE)
! BPMCAS (FAST MODE)
! BPMWRITE (FAST MODE)
!-----------------------------

!-----------------------------
! FUNCA(2-0) = REGSEL(2-0) = 3
! ENABLE MEMORY WRITE
! ZRAS
! ZCAS
! ZWRT
! ENLS
! ENABLE MEMORY ADDRESS COUNT    ; Count addr up by another 1
! MEMORY ADDRESS COUNT UP
!
! BPMRAS (FAST MODE)
! BPMCAS (FAST MODE)
! BPMWRITE (FAST MODE)
!-----------------------------

!-----------------------------
! FUNCA(2-0) = REGSEL(2-0) = 4
! ENABLE MEMORY WRITE
! ZRAS
! ZCAS
! ZWRT
!-----------------------------

!-----------------------------
! FUNCA(2-0) = REGSEL(2-0) = 5
! ENABLE MEMORY WRITE
! ZRAS
! ZCAS
! ZWRT
! ENMS
!-----------------------------
```

```
!-------------------------------
! FUNCA(2-0) = REGSEL(2-0) = 6
! ENABLE MEMORY WRITE
! ZRAS
! ZCAS
! ZWRT
! ENMS
! SDONE
!-------------------------------

!-------------------------------
! FUNCA(2-0) = REGSEL(2-0) = 7
! ENABLE MEMORY WRITE
! SLDBPMADR
!-------------------------------

!-------------------------------
! FUNCA(2-0) = REGSEL(2-0) = 0
! ENABLE MEMORY READ
! Load RGB INREG
! SLDBPMADR
!-------------------------------

!-------------------------------
! FUNCA(2-0) = REGSEL(2-0) = 1
! ENABLE MEMORY READ
! Load RGB INREG
! ZRAS
!-------------------------------

!-------------------------------
! FUNCA(2-0) = REGSEL(2-0) = 2
! ENABLE MEMORY READ
! Load RGB INREG
! ZRAS
! ENABLE MEMORY ADDRESS COUNT      ; Count addr down by 1
!-------------------------------

!-------------------------------
! FUNCA(2-0) = REGSEL(2-0) = 3
! ENABLE MEMORY READ
! Load RGB INREG
! ZRAS
! ZCAS
! ENLS
!-------------------------------

!-------------------------------
! FUNCA(2-0) = REGSEL(2-0) = 4
! ENABLE MEMORY READ
! Load RGB INREG
! ZRAS
! ZCAS
! ENLS
!-------------------------------
```

```
!--------------------------------
! FUNCA(2-0) = REGSEL(2-0) = 5
! ENABLE MEMORY READ
! Load RGB INREG
! ZRAS
! ZCAS
!--------------------------------

!--------------------------------
! FUNCA(2-0) = REGSEL(2-0) = 6
! ENABLE MEMORY READ
! Load RGB INREG
! ZRAS
! ZCAS
! ENMS
! *DONE
!--------------------------------

!--------------------------------
! FUNCA(2-0) = REGSEL(2-0) = 7
! ENABLE MEMORY READ
! Load RGB INREG
! SLDBPMADR
! ZRAS
! ZCAS
! ENMS
!--------------------------------
```

End of FUNCA Counter section

What is claimed is:

1. Apparatus for reducing the number of machine cycles required to display an object by controlling a video controller to define the pixel to pixel variation of pixels within a first group of pixels in a scan line of a video display device having a plurality of said scan lines, which comprises:

means for generating signals representing the values of pixels on said scan lines to control the intensity of said pixels on said scan lines to display said object;

means for providing a reference signal representing the value of a reference pixel of said first group;

means for providing unitary and double delta signals representing the amounts and double the amounts by which the values of pixels in said first group vary from pixel to pixel from said reference pixel;

first means responsive to said unitary and double delta signals and said reference signal and effective in a single machine cycle after set up for simultaneously generating a first series of output signals representing the values of said reference pixel and of selected pixels adjacent and next adjacent said reference pixel, said values varying uniformly with the distance of a particular pixel from said reference pixel;

means operational at the same time as said first means for generating higher multiple signals representing more than double the amounts represented by said reference signal;

second means combining each said output signal with each said higher multiple signal and effective in one next machine cycle following said single machine cycle for generating a second series of output signals for representing the values of the remainder of said pixels of said first group, wherein said values of said second series of output signals vary uniformly from pixel to pixel according to the distance of the particular pixel from said reference pixel; and means for applying said first and second series of output signals to said video controller to control said signals representing the values of said pixels to be displayed on said scan line for displaying said object.

2. Apparatus according to claim 1, wherein successive groups of said pixels extend across said scan line, further comprising:

means responsive to one of said higher multiple signals for causing said reference signal providing means to provide a second reference signal representing the value of the reference pixel of the next group of pixels along said scan line.

3. Apparatus according to claim 2, wherein said values of said first and second series of output signals are indicative of the intensities of said pixels in said first group; and said groups of pixels extend along said scan line from one side of an object to be displayed by said video apparatus to another side of said object, further comprising:

means responsive to the generation of each second series of output signals for initiating further operation of said first and second generating means; and
in said further operation, said first and second generating means generating said first and second series of output signals with respect to said successive groups of pixels until a last one of said groups of pixels at said other side of said object has been reached.

4. Apparatus according to claim 1, wherein:
said reference, delta and higher multiple signals include multiple bits,
each of said first and second means includes a plurality of serial adders and means for cycling said adders to serially process said multiple bits of said reference, delta and higher multiple signals, and
selected ones of said serial adders of said second means receiving the same one of said output signals of said first series and different ones of said higher multiple signals.

5. Apparatus according to claim 1 for defining the pixel intensity variation of said pixels within said first group of pixels and within other groups of pixels in series with said first group along said scan line, said object extending partially across said scan line, wherein a first of said pixels having a first intensity value and being within said first of said groups defines a first edge of said object, wherein said pixels between said first pixel and a last pixel of said scan line at a second edge of said object have different intensities that vary uniformly from pixel to pixel, wherein said pixels between said first pixel and said last pixel may be in one of said groups that is between said first group and another of said groups, said apparatus further comprising:
first means for identifying the number, if any, of said groups of pixels that are between said first of said groups that includes said first pixel and a last of said groups that includes said last pixel;
second means for identifying whether said first and last pixels are within said first group; and
means responsive to said first and second identifying means for cycling the apparatus of claim 1 according to said number of said groups of pixels;
during said cycling said first and second generating means generating one set of first and second series of output signals for said first group and an additional one of said sets for said last group, if any, and for said between group, if any, to uniformly vary the intensities of only those of said pixels as are between said first and last pixels for displaying said object.

6. Apparatus according to claim 5, wherein said first and second series of output signals for said first group includes one signal for each pixel in said group even if said first pixel is between the ends of said first group, further comprising:
means for inhibiting those of said output signals as represent pixels that are beyond said first pixel and outside of said object to be displayed.

7. Apparatus for generating signals that control a video controller to represent pixels on a display screen, comprising:
means for generating signals representing pixels on scan lines of said display screen;
means for supplying a reference signal representing a value of a reference pixel in one of said scan lines that extends across said display screen;
means for supplying delta signals representing unitary and multiple incremental changes in said reference signal from pixel to pixel across a group of pixels into which said one scan line is divided, each said group having "n" pixels therein;
means having a first operational stage and being connected to said reference and delta signal supplying means for simultaneously varying said reference signal once for each pixel in a given subgroup of pixels in said group to generate a first series of output signals representing said pixels in said subgroup, said varying for said pixels in said subgroup being uniformly related to the distance of each said pixel from said reference pixel;
said varying means having a second operational stage connected to said first operational stage and to said delta signal supplying means for simultaneously adding to each of said first series of output signals selected ones of said delta signals representing increasing ones of said multiple incremental changes to generate additional output signals representing the other pixels in said group; and
means for applying said first series of output signals and said additional output signals to said video controller to display an object on said display screen.

8. Apparatus according to claim 7, further comprising:
means connected intermediate said second operational stage and said delta signal supplying means for generating intermediate signals representing other ones of said multiple incremental changes;
said second operational stage receiving said intermediate signals and said output signals for generating said additional output signals; and
means for storing said first output signals and said additional output signals to provide one signal for each of said pixels in a given group of pixels, the values of said signals representing said pixels in said group varying uniformly from pixel to pixel across said group in relation to the distance of each said pixel from said reference pixel.

9. Apparatus according to claim 7, wherein successive groups of said pixels extend across a given scan line, further comprising:
means connected to said delta signal supplying means for causing said reference signal supplying means to supply a signal representing the value of the reference pixel in the next successive group of pixels along said scan line; and
means for cycling both of said operational stages so that said first series of output signals and said additional output signals are generated for said next successive group of pixels.

10. Apparatus according to claim 7 for generating signals that represent pixels on a display screen, wherein each signal for a given pixel is in the form of "m" bits; said apparatus further comprising:
each said reference pixel and delta signal supplying means includes register means having "x" storage locations representing integer values and "y" storage locations representing fractional values of each said bit, where "x" plus "y"="m"; and
means for cycling each said operational stage and said register means to process said fractional values and then said integer values and generate said output signals for said "n" pixels in each said group, wherein each said output signal for a given pixel is defined by "x" plus "y" bits.

11. Apparatus according to claim 10 for generating signals that represent pixels on a display screen, further comprising:

means for each of said pixels in a group for storing only said "x" bits representing the integer values of said output signals.

12. Apparatus according to claim 7 for generating signals that represent the intensity of pixels on a display screen, wherein the values of said signals that represent pixels indicate the intensity with which a given pixel is to be displayed on said display screen, and each signal for a given pixel is in the form of "m" bits; said apparatus further comprising:

each said reference pixel and delta signal supplying means includes register means having "x" storage locations representing integer values and "y" storage locations representing fractional values of each said bit, where "x" plus "y"="m"; and means for cycling each said operational stage and said register means to process said fractional values and then said integer values and generate said output signals for said "n" pixels in each said group, wherein each said output signal for a given pixel is defined by "x" plus "y" bits.

13. Apparatus according to claim 7 for generating signals that represent the depth of said pixels on said display screen, wherein the values of said signals that represent pixels indicate the depth in a field of view of a given pixel that is to be displayed on said display screen, and each signal for a given pixel is in the form of "m" bits; said apparatus further comprising:

each said reference pixel and delta signal supplying means includes register means having "x" storage locations representing integer values and "y" storage locations representing fractional values of each said bit, where "x" plus "y"="m"; and means for cycling each said operational stage and said register means to process said fractional values and then said integer values and generate said output signals for said "n" pixels in each said group, wherein each said output signal for a given pixel is defined by "x" plus "y" bits.

14. Apparatus for generating signals for a video controller that controls the intensities of pixels of a display screen, said pixels being arranged into scan lines wherein each scan line is divided into groups of pixels each having "n" pixels therein, said apparatus reducing the number of machine cycles necessary for generating said signals, comprising:

means for generating signals representing the intensities of said pixels in said scan lines;

means for supplying an input signal representing the intensity of a selected pixel in a first group of pixels in one of said scan lines;

register means for storing signals representing the values of unitary and multiple deltas by which said input signal can be varied from pixel to pixel across each said group of pixels;

first means connected to said supplying means and to said register means and effective in a single machine cycle after set up for simultaneously varying said input signal by a given number of deltas for each pixel in a selected subgroup of pixels in said first group of pixels to generate for each said pixel a first output signal indicative of the intensity of said pixel, the number of deltas for a given one of said pixels in said subgroup being related to the distance of said one pixel from said selected pixel;

second means connected to said first means and to said register means and effective in one next machine cycle following said single machine cycle for varying said output signals by multiple deltas to generate additional output signals representing the intensity of each of the other pixels in said first group of pixels, the number of deltas for a given one of said other pixels in said first group being related to the distance of said last mentioned given one of said other pixels from said selected pixel;

said first and second means being collectively effective to generate one of said output signals for each of said pixels in said first group of pixels; and means for applying said output signals and said additional output signals to said video controller to display an object on said display screen.

15. Apparatus for generating signals according to claim 14, wherein said first means is effective to generate said first output signals having values that vary uniformly from pixel to pixel across said subgroup in relation to the distance of each said pixel from said selected pixel; further comprising:

means connected intermediate said second means and said register means for generating intermediate signals representing selected other multiple deltas;

said second means receiving said intermediate signals and said output signals for generating said additional output signals having values that vary uniformly from one said other pixel to another said other pixel in relation to the distance of each said pixel from said selected pixel; and means for storing said output signals and said additional output signals to provide one signal for each of said pixels in said first group of pixels.

16. Apparatus for generating signals according to claim 14, further comprising:

means connected to said register means for causing said supplying means to supply a second input signal representing the value of the selected pixel in the next successive group of pixels along said scan line; and means for cycling both of said first and second means so that said first and additional output signals are generated for said next successive group of pixels.

17. Apparatus according to claim 14 in which said pixels are ON only within the edges of a polygon to be displayed on said screen, opposite ones of said edges of said polygon crossing predetermined ones of said scan lines and crossing a given scan line either through only said first group of pixels, or through said first group and an adjacent group, or through said first group and a group spaced therefrom by one or more groups, said apparatus further comprising:

means for adding "n" times delta to said input signal to obtain a next reference signal representing the intensity of said selected pixel in said adjacent group;

means responsive to a signal indicating the manner in which said edges cross said groups for controlling said first and second means to be sequenced once to generate said output signals for only those pixels in said first group or to be sequenced twice to generate said output signals for those pixels in said first and adjacent groups or to be sequenced more than twice to generate said output signals for those pixels in said first group and said spaced groups; and said adding means being effective before said first and second sequencing a second and third time so that said output signals for said adjacent group and said spaced groups vary uniformly from pixel to pixel across the scan line within said edges of said polygon.

18. Apparatus according to claim 14, further comprising:

a first set of apparatus according to claim 14 provided for pixel intensity, a second set of said apparatus provided for pixel depth z0, and a third set of said apparatus provided for pixel depth z1;

said input signals representing said pixel depth z0 and z1 have at least two times the number of bits as does the input signal representing said pixel intensity; and control means for inhibiting operation of said first and third sets while said second set processes a first half of said bits, said control means being effective upon processing of said first half for allowing operation of said first, second and third sets so that said output signals representing said intensity and depth z0 are generated in sequence despite said additional number of bits of said depth input signals.

19. Apparatus for generating signals that control a video controller to control the pixels of a display screen, said pixels being arranged into scan lines wherein each scan line is divided into groups of twenty pixels, comprising:

means for generating signals representing said pixels of said display screen;

means for supplying an input signal representing the intensity of a reference pixel in a first group of pixels in said scan line;

register means for storing signals representing unitary, two, four, eight and sixteen incremental variations in said input signal;

first serial adder means connected to said supplying means and to said register means for simultaneously varying said input signal by one of said unitary and double incremental variations for each pixel of five pixels in said first group of pixels, said varying for two of said five pixels being successively multiple incremental variations less than said value of said input signal, said varying for two other of said five pixels being successively multiple incremental variations more than said value of said input signal;

said first serial adder means being effective for generating an output signal for each of said five pixels and a multiple increment signal representing each of five, ten and fifteen of said incremental variations, said output signals having values corresponding to the combined value of said input signal and said unitary and double incremental variations;

second serial adder means connected to said first means and to said register means to form parallel arrays for separately adding to each of said output signals each of said multiple increment signals to generate fifteen additional output signals representing the sixth through twentieth pixels in said first group of pixels, said additional output signals having values corresponding to the combined value of said input signal and said five, ten and fifteen incremental variations;

said output signals representing the intensities of each of said twenty pixels in a given group of pixels along said scan line, said intensities varying uniformly from pixel to pixel according to the distance of a given one of said pixels from said reference pixel; and means for applying said output signals and said additional output signals to said video controller to display an object on said display screen.

20. A method of displaying an object on a screen of a video display device by reducing the required number of machine cycles required to control a video controller, comprising the steps of:

generating signals representing the values of pixels on a scan lines of said video display device, said signals being used to control the intensity of said pixels on said scan lines to display said object;

dividing one of said scan lines into groups of "n" pixels;

providing a reference signal representing the value of a first reference pixel in a first of said groups of pixels;

providing a delta signal representing the change in the value of said reference pixel from pixel to pixel across said first group;

selectively combining said reference signal and said delta signal during a first machine cycle to generate subgroup signals representing the values of each said pixel in a subgroup of "m" pixels adjacent said reference pixel;

simultaneously with said selectively combining step, generating signals representing predetermined multiples of said delta signal;

selectively adding each said subgroup signal to each said multiple signal during a second machine cycle to generate an additional signal representing each of the "n" minus "m" remaining pixels of said given group; and applying said subgroup signals and said additional signals to said video controller to control said signals representing said pixels to display said object on said screen with a desired intensity.

21. The method according to claim 20, comprising the additional steps of:

providing a double delta signal having twice the value of said delta signal;

selectively combining said reference signal and said double delta signal to generate further signals, said subgroup signals and said further signals representing the values of each said pixel in a larger subgroup of "m$^1$" pixels adjacent said reference pixel; and said selectively combining steps being effective to both respectively add and subtract said delta and double delta signals to and from said reference signal so that said subgroup signals and said further signals represent the value of said reference signal minus two delta, minus one delta, plus one delta, plus two delta and having the original value of said reference signal.

22. A method of varying signals according to claim 20, comprising the further step of:

generating an "n" delta signal representing the value of said reference pixel in a second group of pixels adjacent said first group, and after completing said generation of signals representing the values for all of the pixels in said first group of pixels, adding said "n" delta signal to said signal representing said first reference pixel to generate a reference signal representing the value of said reference pixel in said second group.

23. A method for varying signals representing the values of pixels on a given scan line of a video display apparatus according to claim 21, wherein:
"n" is twenty and "m" is five,
said combining step generates signals representing the values of said first five pixels of said group of twenty pixels;
said predetermined multiples of said delta signal are five, ten and fifteen; and
said step of selectively adding generates additional signals having values equal to the value of said reference signal plus three delta through the value of said reference signal plus seventeen delta.

24. Apparatus according to claim 7, wherein:
said first operational stage varies said reference signal by separately subtracting said unitary and multiple incremental change delta signals from said reference signal so that two of said output signals in said first series have values less than that of said reference signal.

* * * * *